(12) United States Patent
Li et al.

(10) Patent No.: US 9,054,374 B2
(45) Date of Patent: Jun. 9, 2015

(54) CATHODE ACTIVE MATERIAL, METHOD OF MANUFACTURING THE SAME AND BATTERY

(75) Inventors: Guohua Li, Fukushima (JP); Nozomu Morita, Fukushima (JP); Tomoyo Ooyama, Fukushima (JP); Kiyohiko Suzuki, Fukushima (JP); Kotaro Satori, Kanagawa (JP); Hideto Azuma, Fukushima (JP); Yosuke Hosoya, Fukushima (JP); Koji Morita, Fukushima (JP); Haruo Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1633 days.

(21) Appl. No.: 11/914,535

(22) PCT Filed: May 11, 2006

(86) PCT No.: PCT/JP2006/009493
§ 371 (c)(1),
(2), (4) Date: Sep. 14, 2009

(87) PCT Pub. No.: WO2006/123572
PCT Pub. Date: Nov. 23, 2006

(65) Prior Publication Data
US 2010/0173197 A1    Jul. 8, 2010

(30) Foreign Application Priority Data

May 17, 2005 (JP) .................................. 2005-144430
Feb. 24, 2006 (JP) .................................. 2006-048279
Mar. 3, 2006 (JP) .................................. 2006-057863

(51) Int. Cl.
| H01M 4/36 | (2006.01) |
| B05D 5/12 | (2006.01) |
| C01G 45/12 | (2006.01) |
| C01G 51/00 | (2006.01) |
| C01G 53/00 | (2006.01) |
| H01M 4/505 | (2010.01) |
| H01M 4/525 | (2010.01) |
| H01M 4/58 | (2010.01) |
| H01M 4/04 | (2006.01) |
| H01M 4/485 | (2010.01) |

(52) U.S. Cl.
CPC ............. *H01M 4/366* (2013.01); *B05D 5/12* (2013.01); *C01G 45/1228* (2013.01); *C01G 51/42* (2013.01); *C01G 51/50* (2013.01); *C01G 53/50* (2013.01); *C01P 2002/02* (2013.01); *C01P 2002/50* (2013.01); *C01P 2002/52* (2013.01); *C01P 2002/72* (2013.01); *C01P 2002/74* (2013.01); *C01P 2004/32* (2013.01); *C01P 2004/50* (2013.01); *C01P 2004/61* (2013.01); *C01P 2004/62* (2013.01); *C01P 2004/80* (2013.01); *C01P 2006/40* (2013.01); *H01M 4/505* (2013.01); *H01M 4/525* (2013.01); *H01M 4/5825* (2013.01); *Y02E 60/122* (2013.01); *H01M 4/0402* (2013.01); *H01M 4/485* (2013.01)

(58) Field of Classification Search
CPC ..... H01M 4/366; H01M 4/505; H01M 4/525; H01M 4/5825; H01M 4/0402; H01M 4/485; Y02E 60/122; B05D 5/12
USPC ......... 429/231.1, 231.3, 223, 224; 252/182.1; 427/58, 123, 126.1
See application file for complete search history.

(56) References Cited

U.S. PATENT DOCUMENTS

| 2003/0211391 | A1 | 11/2003 | Cho et al. |
| 2004/0096743 | A1 | 5/2004 | Okae et al. |
| 2005/0196674 | A1 | 9/2005 | Chiga et al. |
| 2006/0093911 | A1* | 5/2006 | Chiga et al. .................. 429/224 |

FOREIGN PATENT DOCUMENTS

| JP | 2000-188132 | 7/2000 |
| JP | 2001-143703 | 5/2001 |
| JP | 2001-143708 | 5/2001 |
| JP | 2003-20229 | 1/2003 |
| JP | 2003-007299 | 10/2003 |
| JP | 2003-331846 | 11/2003 |
| JP | 2004-087299 | 3/2004 |
| JP | 2004-103566 | 4/2004 |
| JP | 2004-348981 | 12/2004 |
| WO | WO 03/019713 | 3/2003 |

OTHER PUBLICATIONS

Japanese Office Action issued May 1, 2012, for corresponding Japanese Appln. No. 2007-516259.
Japanese Office Action issued Aug. 6, 2013 in corresponding Japanese Patent Application No. 2007-516259.
Japanese Office Action issued May 28, 2014 in corresponding Japanese Patent Application No. 2007-516259.

* cited by examiner

*Primary Examiner* — Laura Weiner
(74) *Attorney, Agent, or Firm* — K&L Gates LLP

(57) ABSTRACT

A cathode active material capable of obtaining a high capacity and capable of improving stability or low-temperature characteristics, a method of manufacturing the same, and a battery are provided. A cathode (21) includes a cathode active material including a lithium complex oxide including Li and at least one kind selected from the group consisting of Co, Ni and Mn, and P and at least one kind selected from the group consisting of Ni, Co, Mn, Fe, Al, Mg and Zn as coating elements on a surface of the lithium complex oxide. Preferably, the contents of the coating elements are higher on the surface of the cathode active material than those in the interior thereof, and decrease from the surface to the interior.

11 Claims, 10 Drawing Sheets

CATHODE ACTIVE MATERIAL, METHOD OF MANUFACTURING THE SAME AND BATTERY

CROSS REFERENCE TO RELATED APPLICATIONS

The present application claims priority to Japanese Patent Document No. 2005-144430 filed on May 17, 2005; Japanese Patent Document No. 2006-048279 filed on Feb. 24, 2006; and Japanese Patent Document No. 2006-057863 on Mar. 3, 2006, the disclosures of which are herein incorporated by reference.

BACKGROUND

The present invention relates to a cathode active material including a lithium complex oxide, a method of manufacturing the same, and a battery.

In recent years, since portable devices such as notebook computers and cellular phones have become more sophisticated and multifunctional, power consumption of the devices has been increasing, and a further increase in capacities of batteries as power sources for the devices has been demanded. Among batteries, in terms of cost effectiveness and a reduction in size and weight, a demand for secondary batteries with a higher capacity is great. As a battery meeting such a demand, for example, a lithium secondary battery is cited.

A lithium secondary battery which is now commonly used uses lithium cobalt oxide for a cathode and a carbon material for an anode, and its operating voltage is within a range from 4.2 V to 2.5 V. In the case of a lithium secondary battery operating at 4.2 V at the maximum, the lithium secondary battery uses only approximately 60% of the theoretical capacity of a cathode active material such as lithium cobalt oxide used for a cathode. Therefore, when a charge voltage is further increased, a remaining capacity can be used in principle, and in reality, it is known that when a voltage at the time of charge is 4.25 V or over, a higher energy density is achieved (refer to Patent Literature 1).

However, when the charge voltage is increased, the potential of the cathode is increased, so an oxidation atmosphere near the cathode is increased, thereby an electrolyte is easily deteriorated by oxidative decomposition. As a result, issues such as a decline in charge-discharge efficiency and a decline in cycle characteristics arise. Moreover, such a reaction is more severe at high temperature, so there is an issue that deterioration of the electrolyte at the time of operating or storing the secondary battery at high temperature is pronounced. Further, in some cases, the secondary battery is used under a low-temperature environment such as cold climate, so a secondary battery having superior characteristics not only at high temperature but also at low temperature is desired.

To improve characteristics, a method of forming a solid solution of an element such as aluminum (Al), magnesium (Mg) or titanium (Ti) in a lithium complex oxide such as lithium cobalt oxide is conventionally well known. Moreover, as a technique to improve stability or low-temperature characteristics of a cathode active material, a method of forming a coating film made of a stable material on a surface of an active material is cited. For example, Patent Literature 2 describes that a surface of lithium cobalt oxide is coated with aluminum oxide ($Al_2O_3$), and Patent Literature 3 describes that an aluminum-containing layer is formed on a surface of a nickel-cobalt complex oxide. Further, Patent Literature 4 describes that a surface of lithium cobalt oxide is coated with lithium titanate ($LiTiO_2$), and Patent Literatures 5 and 6 describe a method of forming a surface layer made of a compound represented by $MXO_k$ (M represents metal, X represents an element capable of forming a double bond with oxygen, and k=2 to 4). Moreover, Patent Literature 7 describes that the concentration of manganese (Mn) on a surface of lithium oxide is higher than in the interior of lithium oxide, and Patent Literature 8 describes that a particle surface of lithium cobalt oxide is coated with a sulfate.

[Patent Literature 1] International Publication No. WO03/0197131
[Patent Literature 2] Japanese Unexamined Patent Application Publication No. 2001-143703
[Patent Literature 3] Japanese Unexamined Patent Application Publication No. 2001-143708
[Patent Literature 4] Japanese Unexamined Patent Application Publication No. 2004-103566
[Patent Literature 5] Japanese Unexamined Patent Application Publication No. 2003-7299
[Patent Literature 6] Japanese Unexamined Patent Application Publication No. 2003-331846
[Patent Literature 7] Japanese Unexamined Patent Application Publication No. 2004-348981
[Patent Literature 8] Japanese Unexamined Patent Application Publication No. 2003-20229

SUMMARY

However, in a technique of forming a solid solution of an element such as aluminum in a lithium complex oxide, when the amount of the solid solution is too small, cycle characteristics at high temperature or a high charge voltage cannot be sufficiently improved, and when the amount of the solid solution is too large, a charge-discharge capacity declines, so there is no point in increasing a battery voltage. Moreover, characteristics cannot be sufficiently improved only by forming a coating film made of an oxide on a surface, so a further improvement is desired.

In view of the foregoing, it is an object of the invention to provide a cathode active material capable of obtaining a high capacity and capable of improving stability or low-temperature characteristics, a method of manufacturing the same, and a battery.

A cathode active material according to the invention includes: a lithium complex oxide including lithium (Li) and at least one kind selected from the group consisting of cobalt (Co), nickel (Ni) and manganese (Mn); and phosphorus (P) and at least one kind selected from the group consisting of nickel, cobalt, manganese, iron (Fe), aluminum (Al), magnesium (Mg) and zinc (Zn) as coating elements on a surface of the lithium complex oxide.

A method of manufacturing a cathode active material according to the invention includes the step of coating a particle surface of a lithium complex oxide including lithium and at least one kind selected from the group consisting of cobalt, nickel and manganese with a compound including phosphorus and at least one kind selected from the group consisting of nickel, cobalt, manganese, iron, aluminum, magnesium and zinc, and firing them.

A battery according to the invention includes: a cathode; an anode; and an electrolyte, wherein the cathode includes a cathode active material including a lithium complex oxide, the lithium complex oxide including lithium and at least one kind selected from the group consisting of cobalt, nickel and manganese, and the cathode active material includes phosphorus and at least one kind selected from the group consisting of nickel, cobalt, manganese, iron, aluminum, magnesium and zinc as coating elements on its surface.

In the cathode active material according to the invention, the lithium complex oxide is included, and phosphorus and a coating element are included on the surface of the lithium complex oxide, so a high capacity can be obtained, and chemical stability and low-temperature characteristics can be improved. Therefore, in the battery according to the invention, a high energy density can be obtained, and charge-discharge efficiency at high temperature or low temperature can be improved.

In the method of manufacturing a cathode active material according to the invention, the particle surface of the lithium complex oxide is coated with a compound including phosphorus and at least one kind selected from the group consisting of nickel, cobalt, manganese, iron, aluminum, magnesium and zinc, and is fired, so the cathode active material can be easily obtained.

Additional features and advantages of the present invention are described in, and will be apparent from, the following Detailed Description and the Figures.

DETAILED DESCRIPTION

Figure 1:
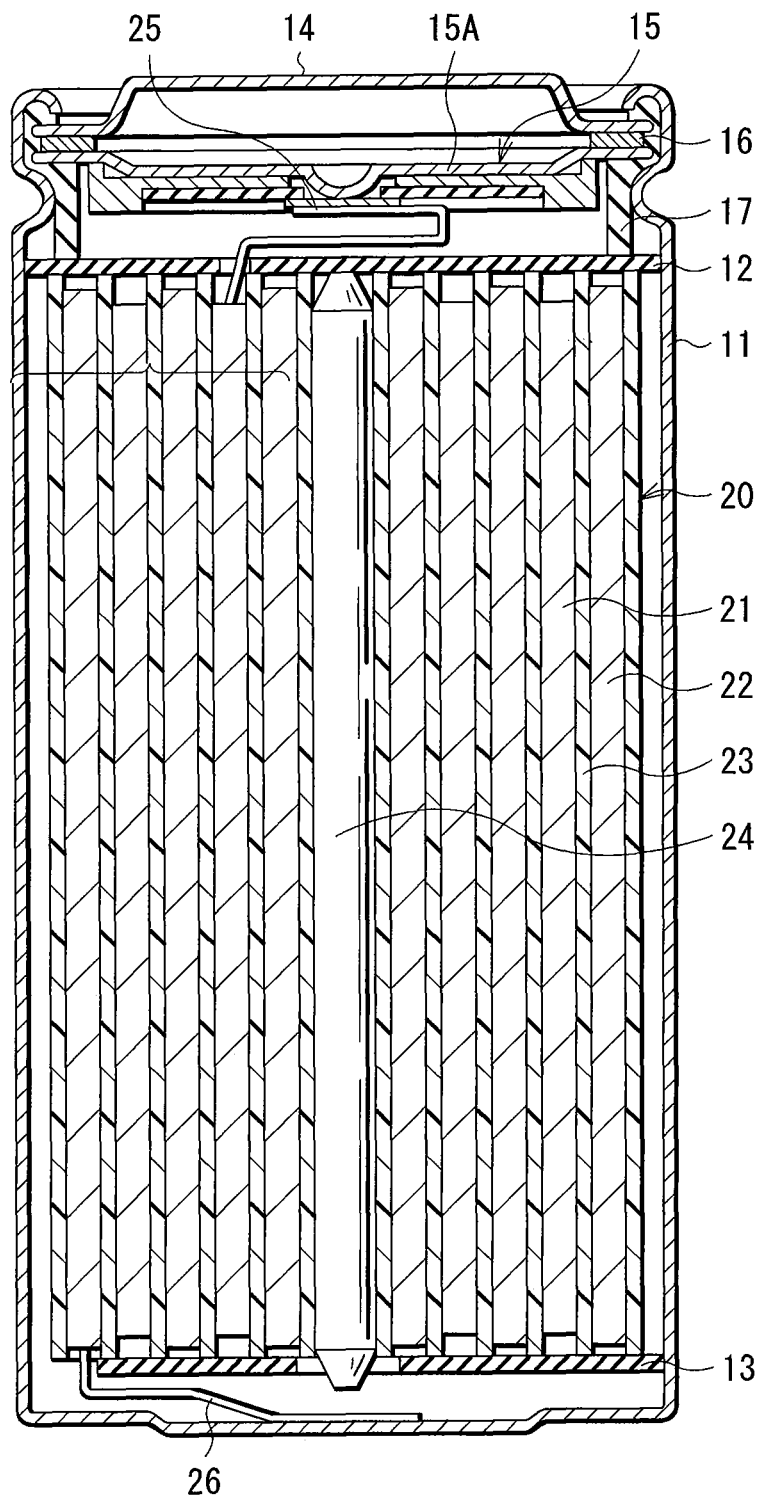
FIG. 1 is a sectional view showing the configuration of a first secondary battery using a cathode active material according to an embodiment of the invention.

A preferred embodiment will be described in detail below referring to the accompanying drawings.

A cathode active material according to an embodiment of the invention is, for example, particulate matter, and includes a central section including a lithium complex oxide which includes lithium and at least one kind selected from the group consisting of cobalt, nickel and manganese. Moreover, a surface layer including a compound which includes phosphorus and at least one kind selected from the group consisting of nickel, cobalt, manganese, iron, aluminum, magnesium and zinc is arranged on at least a part of a surface of the central section. In other words, the cathode active material includes a lithium complex oxide, and includes phosphorus and at least one kind selected from the group consisting of nickel, cobalt, manganese, iron, aluminum, magnesium and zinc as coating elements on the surface of the lithium complex oxide. Thereby, the cathode active material can obtain a high energy density and can improve chemical stability or reactivity at low temperature.

As the lithium complex oxide, for example, a compound represented by Chemical Formula 1, 2 or 3 is preferable, and two or more kinds of the compounds may be included. It is because a higher energy density can be obtained with such a composition.

$$Li_xCo_aM1_bO_{2-c}$$ (Chemical Formula 1)

(where M1 represents at least one kind selected from the group consisting of nickel, manganese, magnesium, aluminum, boron (B), titanium (Ti), vanadium (V), chromium (Cr), iron, copper (Cu), zinc, molybdenum (Mo), tin (Sn), calcium (Ca), strontium (Sr), tungsten (W), zirconium (Zr) and silicon (Si), the values of x, a, b and c are within ranges of $0.8 \le x \le 1.2$, $0.8 \le a \le 1$, $0 \le b \le 0.2$ and $-0.1 \le c \le 0.2$ respectively, and M1 is an element for improving stability or the like, and is an arbitrary element to be added if necessary.)

$$Li_yNi_dM2_eO_{2-f}$$ (Chemical Formula 2)

(where M2 represents at least one kind selected from the group consisting of cobalt, manganese, magnesium, aluminum, boron, titanium, vanadium, chromium, iron, copper, zinc, molybdenum, tin, calcium, strontium, tungsten, zirconium and silicon, the values of y, d, e and f are within ranges of $0.8 \le y \le 1.2$, $0.3 \le d \le 0.98$, $0.02 \le e \le 0.7$ and $-0.1 \le f \le 0.2$, respectively, and M2 is an element for improving stability or the like, and is an arbitrary element to be added if necessary.)

$$Li_zMn_{2-g}M3_gO_{4-h}$$ (Chemical Formula 3)

(where M3 represents at least one kind selected from the group consisting of cobalt, nickel, magnesium, aluminum, boron, titanium, vanadium, chromium, iron, copper, zinc, molybdenum, tin, calcium, strontium and tungsten, the values of z, g and h are within ranges of $0.8 \le z \le 1.2$, $0 \le g < 1.0$ and $-0.2 \le h \le 0.2$, respectively, and M3 is an element for improving stability or the like, and is an arbitrary element to be added if necessary.)

The surface layer may include any other element in addition to the above-described coating elements. As the other element, lithium, oxygen (O), an element constituting a lithium complex oxide or the like is cited. One kind or two or more kinds of compounds constituting the surface layer may be included. As the coating elements, phosphorus and at least one kind selected from the group consisting of manganese, magnesium and aluminum are more preferable. It is because higher characteristics can be obtained. In the case where aluminum is included as the coating element, an atomic ratio (P/Al) of phosphorus to aluminum on the surface is preferably 0.3 or more, and more preferably within a range from 0.35 to 12.7 both inclusive. It is because when the atomic ratio is too small, a sufficient effect cannot be obtained, and when the atomic ratio is too large, an improvement effect is saturated.

Moreover, it is preferable that the contents of the coating elements are higher on the surface of the cathode active material than those in the interior thereof, and the coating elements are present so that the coating elements decrease from the surface to the interior of the cathode active material. It is because a higher effect can be obtained. The amount of the surface layer is preferably within a range from 0.2 wt % to 5 wt % both inclusive relative to the weight of the lithium complex oxide included in the central section. It is because when the amount is too small, a sufficient effect cannot be obtained, and when the amount is too large, the capacity declines. Further, preferable coating amounts of the coating elements in the surface layer depend on the kinds of the coating elements, and in the case where phosphorus and manganese are included as the coating elements, the coating amounts are preferably within a range from 0.2 mol % to 6.0 mol % both inclusive relative to the lithium complex oxide, and in the case where phosphorus and magnesium are included, the coating amounts are preferably within a range from 0.2 mol % to 4.0 mol % both inclusive. Alternatively, in the case where phosphorus and aluminum are included as coating elements, the total amount of the coating elements including phosphorus and aluminum is within a range from 0.2 mol % to 6.0 mol % both inclusive relative to the lithium complex oxide. It is because in all cases, when the amount is too small, a sufficient effect cannot be obtained, and when the amount is too large, the capacity declines.

The surface layer can be confirmed by checking a change in concentration of an element constituting the cathode active material from the surface to the interior of the cathode active material. The change in concentration can be measured, for example, by analyzing the composition of the cathode active material by Auger electron spectroscopy (AES) or secondary ion mass spectrometry (SIMS) while shaving the cathode active material by sputtering or the like. Moreover, the change in concentration can be measured by slowly dissolving the cathode active material in an acidic solution or the like, and analyzing a change in the dissolved cathode active material with time by inductively coupled plasma (ICP) spectrometry.

The cathode active material can be manufactured, for example, by mixing and firing compounds of elements constituting the lithium complex oxide to form a particulate central section, putting the central section in a solution or a suspension of a compound including the coating elements to coat the surface of the central section with the compound including the coating elements, and firing the compound to form the surface layer. Moreover, the cathode active material may be manufactured, for example, by forming the central section in the same manner, and then coating the surface of the central section with a compound of the coating elements by a sputtering method, a laser ablation method, a mechanofusion method or the like, and firing the compound. As materials of the central section and the surface layer, an oxide, a hydroxide, an oxyhydroxide, a carbonate, a nitrate, an organic complex salt or the like of each element can be used.

For example, the cathode active material is used in a secondary battery as described below.

(First Secondary Battery)

FIG. 1 shows a sectional configuration of a first secondary battery using the cathode active material according to the embodiment. The secondary battery is a so-called lithium-ion secondary battery in which lithium is used as an electrode reactant, and the capacity of an anode is represented by a capacity component by insertion and extraction of lithium. The secondary battery is a so-called cylindrical type, and includes a spirally wound electrode body 20 which includes a pair of a strip-shaped cathode 21 and a strip-shaped anode 22 spirally wound with a separator 23 in between in a substantially hollow cylindrical-shaped battery can 11. An electrolytic solution as a liquid electrolyte is injected into the battery can 11, and the separator 23 is impregnated with the electrolytic solution. The battery can 11 is made of, for example, nickel-plated iron, and an end portion of the battery can 11 is closed, and the other end portion thereof is opened. In the battery can 11, a pair of insulating plates 12 and 13 are disposed such that the spirally wound electrode body 20 is sandwiched therebetween in a direction perpendicular to a peripheral winding surface.

In the opened end portion of the battery can 11, a battery cover 14, and a safety valve mechanism 15 and a positive temperature coefficient device (PTC device) 16 disposed inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A center pin 24 is inserted into the center of the spirally wound electrode body 20. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
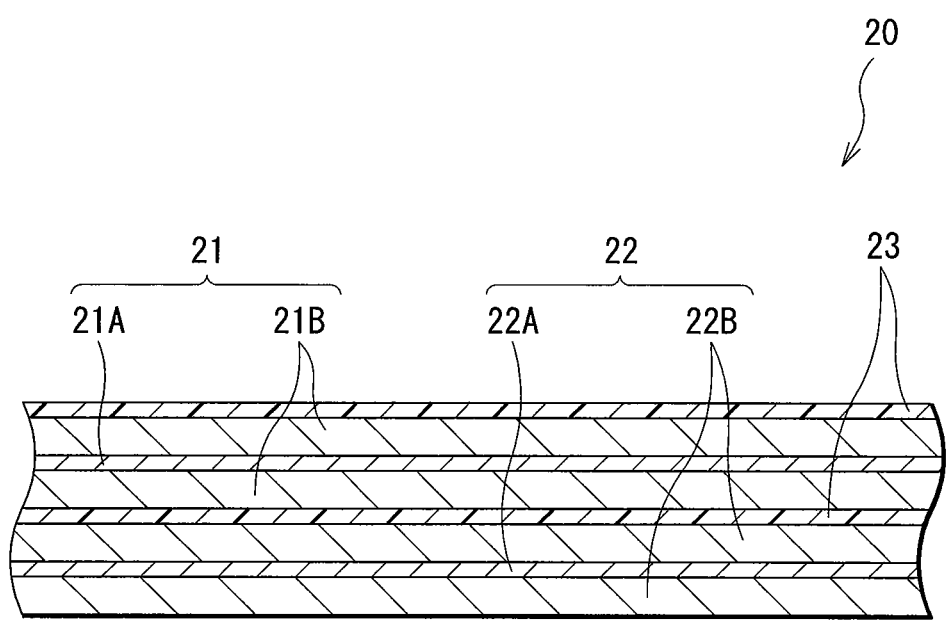
FIG. 2 is an enlarged sectional view of a part of a spirally wound electrode body in the secondary battery shown in FIG. 1.

FIG. 2 shows an enlarged view of a part of the spirally wound electrode body 20 shown in FIG. 1. The cathode 21 has a configuration in which a cathode active material layer 21B is arranged on both sides of a cathode current collector 21A having a pair of facing surfaces. Although it is not shown, the cathode active material layer 21B may be arranged on only one side of the cathode current collector 21A. The cathode current collector 21A is made of, for example, metal foil such as aluminum foil, nickel foil or stainless foil. The cathode active material layer 21B includes, for example, the particulate cathode active material according to the embodiment and, if necessary, an electrical conductor such as graphite and a binder such as polyvinylidene fluoride, and may further include any other cathode active material.

The anode 22 has a configuration in which an anode active material layer 22B is arranged on both sides of an anode current collector 22A having a pair of facing surfaces. Although it is not shown, the anode active material layer 22B may be arranged on only one side of the anode current collector 22A. The anode current collector 22A is made of, for example, a metal foil having good electrochemical stability, electrical conductivity and a mechanical strength such as copper foil, nickel foil or stainless foil. In particular, copper foil is the most preferable, because the copper foil has high electrical conductivity.

The anode active material layer 22B includes one kind or two or more kinds of anode materials capable of inserting and extracting lithium as anode active materials, and includes, if necessary, the same binder as that in the cathode active material layer 21B.

In the secondary battery, the charge capacity of the anode material capable of inserting and extracting lithium is larger than the charge capacity of the cathode 21, so lithium metal is not precipitated on the anode 22 during charge.

Moreover, the open circuit voltage (that is, battery voltage) of the secondary battery in a fully charged state may be 4.20 V, but is preferably designed to be higher than 4.20 V and within a range from 4.25 V to 4.60 V both inclusive. It is because when the battery voltage is increased, the energy density can be increased, and according to the embodiment, the chemical stability of the cathode active material is improved, so even if the battery voltage is increased, superior cycle characteristics can be obtained. In this case, compared to the case where the battery voltage is 4.20 V, even if the same cathode active material is used, the amount of extraction of lithium per unit weight is increased, so the amounts of the cathode active material and the anode active material are adjusted according to this.

As the anode material capable of inserting and extracting lithium, for example, carbon materials such as non-graphitizable carbon, graphitizable carbon, graphite, kinds of pyrolytic carbon, kinds of coke, kinds of glass-like carbon, fired organic polymer compound bodies, carbon fibers and activated carbon are used. Among them, kinds of coke include pitch coke, needle coke, petroleum coke and so on. The fired organic polymer compound bodies are polymers such as a phenolic resin and a furan resin which are carbonized by firing at an adequate temperature, and a part of them may be classed as non-graphitizable carbon or graphitizable carbon. These carbon materials are preferable, because a change in a crystal structure at the time of charge and discharge is very small, and a high charge-discharge capacity can be obtained, and superior cycle characteristics can be obtained. In particular, graphite is preferable, because its electrochemical equivalent is large, and a high energy density can be obtained. Moreover, non-graphitizable carbon is preferable, because superior cycle characteristics can be obtained. Further, a carbon material in which the charge-discharge potential is low, more specifically the charge-discharge potential is close to that of lithium metal is preferable, because the energy density of a battery can be easily increased.

As the anode material capable of inserting and extracting lithium, a material capable of inserting and extracting lithium and including at least one kind selected from the group consisting of metal elements and metalloid elements as an element is cited, because when such a material is used, a high energy density can be obtained. In particular, the material is more preferably used with a carbon material, because a high energy density can be obtained, and superior cycle characteristics can be obtained. The anode material may be a simple substance, an alloy or a compound of a metal element or a metalloid element, or a material including a phase including one kind or two or more kinds of them at least in part. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As the metal element or the metalloid element included in the anode material, magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) or platinum (Pt) is cited. They may be crystalline or amorphous.

Among them, as the anode material, an anode material including a Group 4B metal element or a Group 4B metalloid element in the short form of the periodic table of the elements as an element is preferable, and an anode material including at least one of silicon and tin as an element is more preferable. It is because silicon and tin have a high capability to insert and extract lithium, and can obtain a high energy density.

As an alloy of tin, for example, an alloy including at least one kind selected from the group consisting of silicon, nickel, copper, iron, cobalt, manganese, zinc, indium, silver, titanium, germanium, bismuth, antimony (Sb) and chromium as a second element in addition to tin is cited. As an alloy of silicon, for example, an alloy including at least one kind selected from the group consisting of tin, nickel, copper, iron, cobalt, manganese, zinc, indium, silver, titanium, germanium, bismuth, antimony and chromium as a second element in addition to silicon is cited.

As a compound of tin or a compound of silicon, for example, a compound including oxygen or carbon (C) is cited, and the compound may include the above-described second element in addition to tin or silicon.

As an anode material capable of inserting and extracting lithium, another metal compound or a polymer material is further cited. As the metal compound, an oxide such as $MnO_2$, $V_2O_5$, or $V_6O_{13}$, a sulfide such as NiS or MoS or a nitride such as lithium nitride is cited, and as the polymer material, polyacetylene, polypyrrole or the like is cited.

The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated. Among them, a porous film made of polyolefin is preferable, because an effect of preventing a short circuit is superior, and the stability of the battery can be improved by a shutdown effect.

The electrolytic solution includes a solvent made of, for example, a nonaqueous solvent such as an organic solvent and an electrolyte salt dissolved in the solvent.

As the nonaqueous solvent, a cyclic carbonate such as ethylene carbonate or propylene carbonate can be used, and one of ethylene carbonate and propylene carbonate, in particular a mixture of them is preferably used. It is because cycle characteristics can be improved.

As the nonaqueous solvent, in addition to the cyclic carbonate, a chain carbonate such as diethyl carbonate, dimethyl carbonate, ethyl methyl carbonate or methyl propyl carbonate is preferably mixed and used. It is because high ionic conductivity can be obtained.

As the nonaqueous solvent, 2,4-difluoroanisole or vinylene carbonate is preferably further included. It is because 2,4-difluoroanisole can improve a discharge capacity, and vinylene carbonate can improve cycle characteristics. Therefore, they are preferably mixed and used, because the discharge capacity and the cycle characteristics can be improved.

In addition to the above materials, as the nonaqueous solvent, butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethyl formamide, N-methylpyrrolidinone, N-methyloxazolidinone, N,N-dimethylimidazolidinone, nitromethane, nitroethane, sulfolane, dimethyl sulfoxide, trimethyl phosphate or the like is cited.

In some cases, a compound formed by substituting fluorine (F) for at least a part of hydrogen (H) in the nonaqueous solvent is preferable, because depending on the kinds of electrodes, electrode reaction reversibility may be improved.

As the electrolyte salt, for example, a lithium salt is cited, and only one kind or a mixture of two or more kinds of lithium salts may be used. As the lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxalate-O,O'] lithium borate, lithium bis(oxalato) borate, LiBr or the like is cited. Among them, $LiPF_6$ is preferable, because high ionic conductivity can be obtained, and cycle characteristics can be improved.

For example, the secondary battery can be manufactured by the following steps.

At first, for example, the cathode active material layer 21B is formed on the cathode current collector 21A to form the cathode 21. The cathode active material layer 21B is formed by mixing the cathode active material, the electrical conductor and the binder to form a cathode mixture, dispersing the cathode mixture in a solvent such as N-methyl-2-pyrrolidone to form paste-form cathode mixture slurry, applying the cathode mixture slurry to the cathode current collector 21A, drying the solvent, and compression molding the cathode mixture slurry by a roller press or the like.

Moreover, for example, the anode active material layer 22B is formed on the anode current collector 22A to form the anode 22. The anode active material layer 22B may be formed, for example, by any of a vapor-phase method, a liquid-phase method, a firing method or coating, or a combination of two or more methods selected from them. In the case where the anode active material layer 22B is formed by a vapor-phase method, a liquid-phase method or firing method, at the time of formation, the anode active material layer 22B and the anode current collector 22A may be alloyed in at least a part of an interface between them; however, they may be further alloyed by a heat treatment under a vacuum atmosphere or non-oxidation atmosphere.

As the vapor-phase method, for example, a physical deposition method or a chemical deposition method can be used, and more specifically, a vacuum deposition method, a sputtering method, an ion plating method, a laser ablation method, a thermal CVD (Chemical Vapor Deposition) method, a plasma CVD method or the like can be used. As the liquid-phase method, a known method such as electrolytic plating or electroless plating can be used. As the firing method, a known technique such as, for example, an atmosphere firing method, a reaction firing method or a hot press firing method can be used. In the case of coating, the anode 22 can be formed as in the case of the cathode 21.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between, and an end of the cathode lead 25 is welded to the safety valve mechanism 15, and an end of the anode lead 26 is welded to the battery can 11, and the cathode 21 and the anode 22 which are spirally wound are sandwiched between a pair of insulating plates 12 and 13, and are contained in the battery can 11. After the cathode 21 and the anode 22 are contained in the battery can 11, the electrolytic solution is injected into the battery can 11 so that the separator 23 is impregnated with the electrolytic solution. After that, the battery cover 14, the safety valve mechanism 15 and the PTC device 16 are fixed in an opened end portion of the battery can 11 by caulking by the gasket 17. Thereby, the secondary battery shown in FIGS. 1 and 2 is formed.

When the secondary battery is charged, for example, lithium ions are extracted from the cathode active material layer 21B, and are inserted into the anode material capable of inserting and extracting lithium which is included in the anode active material layer 22B through the electrolytic solution. Next, when the secondary battery is discharged, for example, the lithium ions inserted into the anode active material capable of inserting and extracting lithium in the anode active material layer 22B are extracted and are inserted into the cathode active material layer 21B through the electrolytic solution. In the embodiment, the cathode active material including the lithium complex oxide and the coating elements on its surface is used, so the chemical stability of the cathode 21 is improved, and even if the open circuit voltage in a fully charged state is increased, or even if the secondary battery is charged at high temperature, the deterioration reaction of the cathode 21 and the electrolytic solution is prevented. Moreover, reactivity at low temperature is improved.

Thus, in the embodiment, the lithium complex oxide is included, and the coating elements are included on the surface, so the chemical stability of the cathode active material can be improved, and a decline in the capacity of the cathode active material at a high potential or in a high-temperature environment can be prevented. Therefore, even if the charge voltage is higher than 4.2 V, or even if the secondary battery is used or stored at high temperature, the deterioration reaction of the cathode 21 and the electrolytic solution can be prevented, and a high energy density can be obtained, and battery characteristics such as cycle characteristics can be improved by improving the charge-discharge efficiency. Moreover, reactivity at low temperature can be improved, and low-temperature characteristics can be improved.

(Second Secondary Battery)

Figure 3:
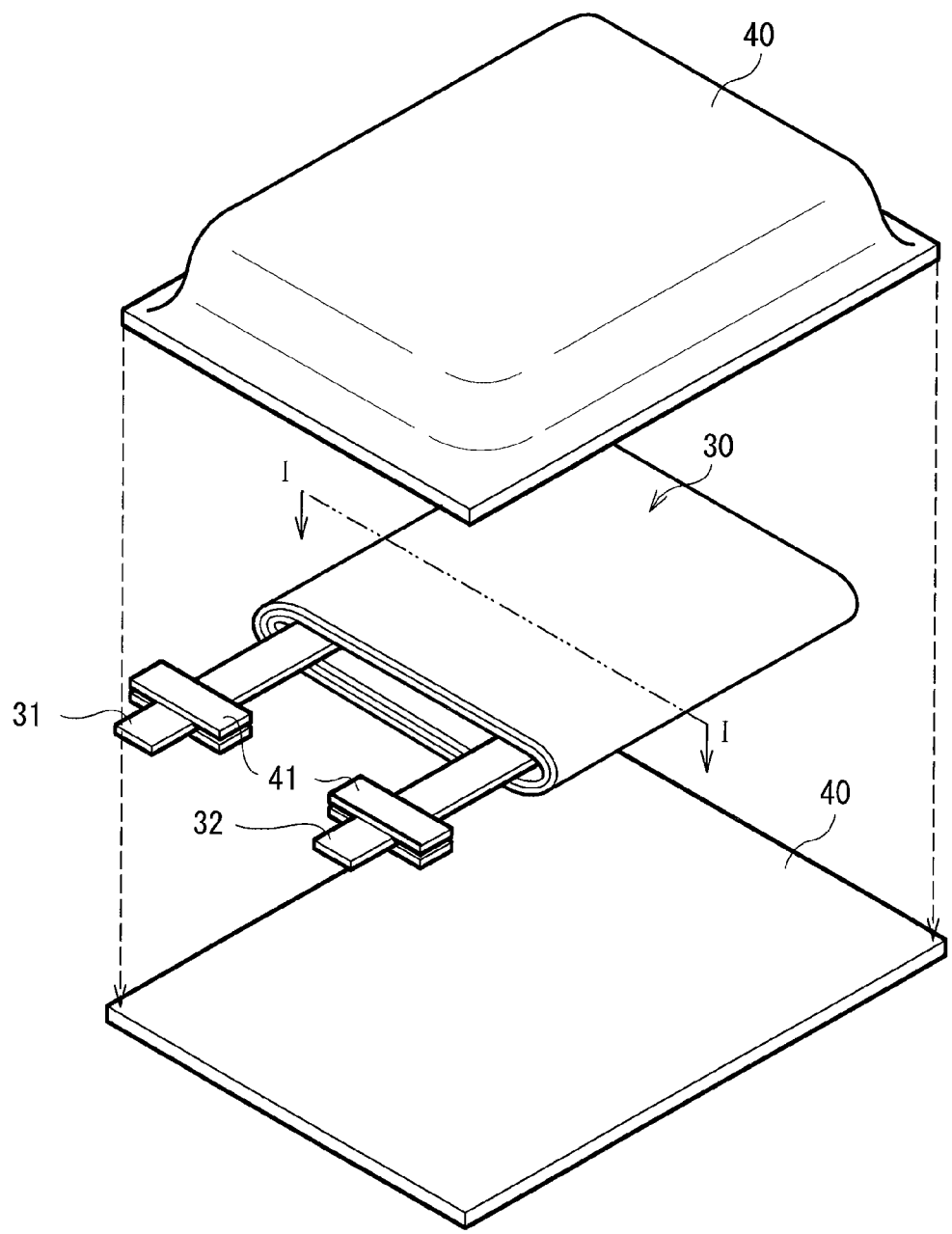
FIG. 3 is an exploded perspective view showing the configuration of a second secondary battery using the cathode active material according to the embodiment of the invention.

FIG. 3 shows the configuration of a secondary battery according to a second secondary battery of the invention. In the secondary battery, a spirally wound electrode body 30 to which a cathode lead 31 and an anode lead 32 are attached is contained in film-shaped package members 40, so the size, the weight and the profile of the secondary battery can be reduced.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described aluminum laminate film.

Figure 4:
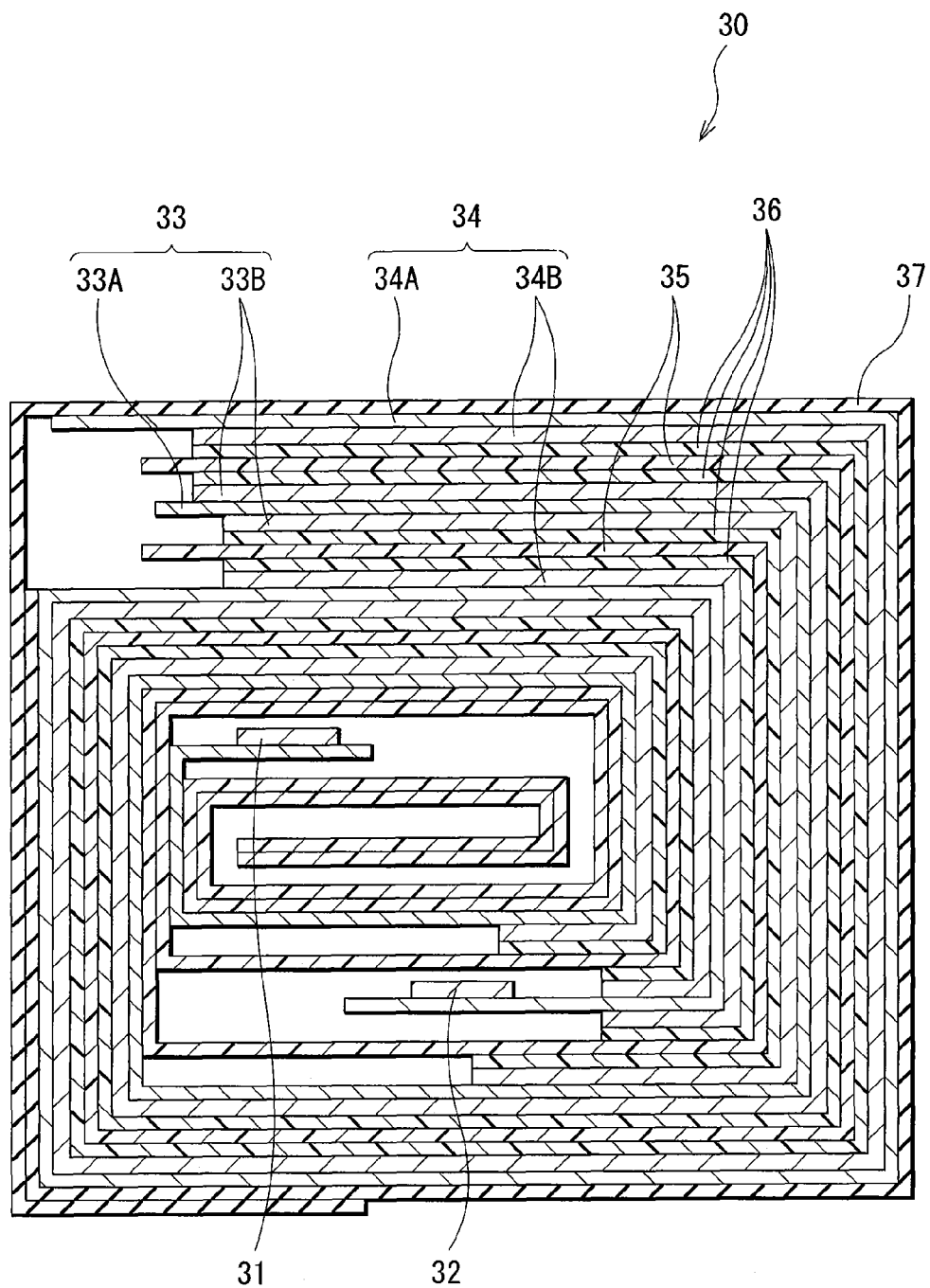
FIG. 4 is a sectional view of a spirally wound electrode body taken along a line I-I of FIG. 3.

FIG. 4 shows a sectional configuration of the spirally wound electrode body 30 taken along a line I-I of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a configuration in which a cathode active material layer 33B is arranged on both sides of a cathode current collector 33A, and the anode 34 has a configuration in which an anode active material layer 34B is arranged on both sides of an anode current collector 34A. The configurations of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 which are described above, respectively.

The electrolyte layer 36 includes an electrolytic solution and a polymer compound as a holding body which holds the electrolytic solution, and is a so-called gel electrolyte. The gel electrolyte is preferable, because high ionic conductivity can be obtained, and liquid leakage from the battery can be prevented. The composition of the electrolytic solution is the same as that of the first secondary battery. As the polymer compound, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, poly(methyl methacrylate), polyacrylic acid, polymethacrylic acid, styrene-butadiene rubber, nitrile-butadiene rubber, polystyrene or polycarbonate is cited. More specifically, in terms of electrochemical stability, polyacrylonitrile, polyvinylidene fluoride, polyhexafluoropropylene or polyethylene oxide is preferable.

The secondary battery can be manufactured by the following steps, for example.

At first, after the cathode 33 and the anode 34 are formed as in the case of the first secondary battery, the electrolyte layer 36 is formed by coating the cathode 33 and the anode 34 with a precursor solution including the electrolytic solution, the polymer compound and a mixture solvent, and volatilizing the mixture solvent. After that, the cathode lead 31 is attached to the cathode current collector 33A, and the anode lead 32 is attached to the anode current collector 34A. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is bonded to an outermost portion of the laminate so as to form the spirally wound electrode body 30. Finally, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the secondary battery may be formed by the following steps. At first, after the cathode 33 and the anode 34 are formed as described above, and the cathode lead 31 and the anode lead 32 are attached to the cathode 33 and the anode 34, respectively, the cathode 33 and the anode 34 are laminated with the separator 35 in between to form a laminate, and the laminate is spirally wound, and then the protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for edge portions on one side are adhered by thermal fusion bonding to form a pouched package, thereby the spirally wound body is contained in the package members 40. Next, an electrolytic composition which includes the electrolytic solution, monomers as materials of a polymer compound and a polymerization initiator and, if necessary, any other material such as a polymerization inhibitor are injected in the package members 40, and an opened portion of the package members 40 are sealed. After that, the monomers are polymerized by applying heat to form the polymer compound, thereby the gel electrolyte layer 36 is formed, and the secondary battery shown in FIGS. 3 and 4 is assembled.

The functions and the effects of the secondary battery are the same as those in the first secondary battery.

EXAMPLES

Specific examples of the invention will be described in detail below.

Examples 1-1 to 1-5

The cathode active material was formed by the following steps. At first, lithium carbonate ($Li_2CO_3$), cobalt carbonate ($CoCO_3$), aluminum hydroxide ($Al(OH)_3$) and manganese carbonate ($MgCO_3$) as commercial reagents were mixed well while pulverizing them in a ball mill. At that time, the molar ratio of lithium, cobalt, aluminum and magnesium was Li:Co:Al:Mg=1.05:0.98:0.01:0.01. Next, after the mixture was preliminarily fired for 5 hours in air at 650° C., and was kept for 20 hours in air at 950° C., the mixture was cooled down to 150° C. by reducing the temperature by 7° C. per minute to synthesize a lithium complex oxide. After that, the lithium complex oxide was taken out to a room-temperature environment, and was pulverized to form the lithium complex oxide into a particulate lithium complex oxide, and the lithium complex oxide was used as the central section. When the particle diameter of the formed central section was measured by a laser scattering method, the average particle diameter was 13 μm, and the analytical value of the mean chemical composition of the lithium complex oxide was $Li_{1.03}Co_{0.98}Al_{0.01}Mg_{0.01}O_2$.

Next, the surface layer including a compound which included phosphorus was formed on the surface of the central section. At that time, in Example 1-1, 1 kg of the lithium complex oxide particles as the central section were added and stirred in a solution formed by dissolving 23.5 g of aluminum lactate in pure water, and after a solution formed by dissolving 21.1 g of diammonium hydrogen phosphate (($NH_4)_2HPO_4$) in pure water was dropped in the solution containing the lithium complex oxide particles, and stirred for approximately 1 hour to form a solid-liquid mixture, the solid-liquid mixture was dried at 200° C., and was heated for 5 hours at 800° C. to form the surface layer.

In Example 1-2, 1 kg of the lithium complex oxide particles as the central section was added and stirred in a solution formed by dissolving 59.8 g of magnesium nitrate hexahydrate ($Mg(NO_3)_2 \cdot 6H_2O$) in pure water, and after a solution formed by dissolving 18.0 g of diammonium hydrogen phosphate was dropped in the solution containing the lithium complex oxide particles, and stirred for approximately 1 hour to form a solid-liquid mixture, the solid-liquid mixture was dried at 200° C., and was heated for 5 hours at 800° C. to form the surface layer.

In Example 1-3, after 28.4 g of cobalt phosphate octahydrate ($Co(PO_4)_2 \cdot 8H_2O$) was pulverized in pure water as a dispersion medium by a bead mill method to form slurry containing a solid portion with an average particle diameter of 0.9 μm, 1 kg of the lithium complex oxide particles as the central section was added and stirred in the slurry to form a solid-liquid mixture, and the solid-liquid mixture was dried at 200° C., and was heated for 5 hours at 800° C. to form the surface layer.

In Example 1-4, after 4.8 g of lithium phosphate ($Li_3PO_4$) and 18.6 g of zinc phosphate tetrahydrate ($Zn_3(PO_4)_2 \cdot 4H_2O$)

were mixed, and were pulverized in pure water as a dispersion medium by a bead mill method to form slurry containing a solid portion with an average particle diameter of 0.8 μm, 1 kg of the lithium complex oxide particles as the central section was added and stirred in the slurry to form a solid-liquid mixture, and the solid-liquid mixture was dried at 200° C., and was heated for 5 hours at 800° C. to form the surface layer.

In Example 1-5, after lithium phosphate, manganese phosphate octahydrate ($Mn_3(PO_4)_2 \cdot 8H_2O$) and iron phosphate octahydrate ($Fe_3(PO_4)_2 \cdot 8H_2O$) were mixed, and fired at 550° C. in a nitrogen stream to synthesize $LiMn_{0.65}Fe_{0.35}PO_4$, the surface of the lithium complex oxide particle as the central section was coated with $LiMn_{0.65}Fe_{0.35}PO_4$ by a mechanofusion method to form the surface layer. When the X-ray diffraction measurement of the synthesized $LiMn_{0.65}Fe_{0.35}PO_4$ was carried out, it was confirmed that $LiMn_{0.65}Fe_{0.35}PO_4$ had an olivine structure.

The powder X-ray diffraction measurement of the formed cathode active materials of Examples 1-1 to 1-5 was carried out. As an X-ray diffractometer, a rotating-anode type X-ray diffractometer Rigaku RINT2500 was used. The X-ray diffractometer included a vertical type goniometer with a radium of 185 mm, and the X-ray diffractometer made an X-ray monochromatic by the combination of a multichannel analyzer and a counter monochromator without using a filter such as Kβ filter. In the measurement, as a specific X-ray, a CuK α ray (40 kV, 200 mA) was used, and an incident angle DS with a sample surface and an angle RS which a diffraction line formed with the sample surface were 1°, and a width SS of an entrance slit was 0.15 mm, and the measurement was carried out by continuous scanning (a scanning range 2θ=10° to 90°, and a scanning speed of 4°/min) by a reflection method.

As a result, in Example 1-1, a diffraction peak derived from a bond between aluminum and phosphorus was observed in addition to the diffraction peak of the lithium complex oxide included in the central section. In Example 1-2, a diffraction peak derived from a bond between magnesium and phosphorus was observed. In Example 1-3, a diffraction peak derived from a bond between cobalt and phosphorus was observed. In Example 1-4, a diffraction peak derived from a bond between zinc and phosphorus was observed. In Example 1-5, diffraction peaks derived from a bond between manganese and phosphorus and a bond between iron and phosphorus were observed.

Figure 5:
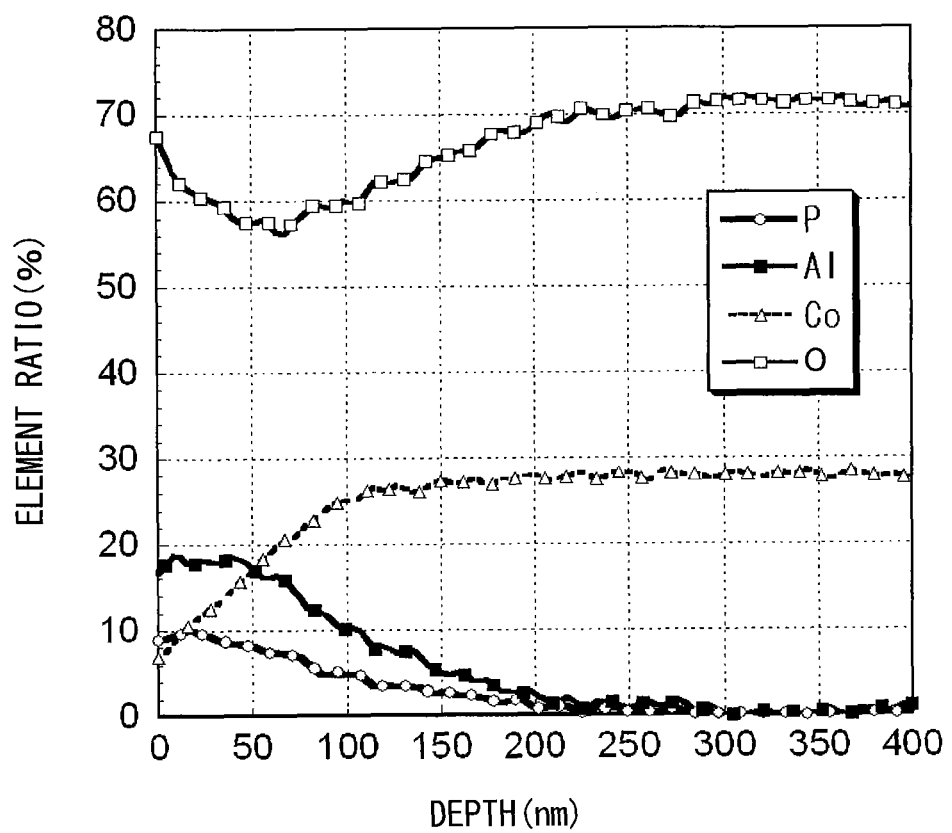
FIG. 5 is a plot showing a change in an element composition ratio by Auger electron spectroscopy in a depth direction of a cathode active material of Example 1-1.

Moreover, each of the formed cathode active materials of Examples 1-1 to 1-5 was bonded to indium metal foil, and the element composition of the surface and the element distribution in a depth direction were measured by the combined use of Auger electron spectroscopy (AES) and sputter etching. FIG. 5 shows the results of Example 1-1 as a representative. In FIG. 5, phosphorus, aluminum, cobalt and oxygen as main elements are shown. Moreover, in Table 1, elements included in the surface layer in each example are shown. As a result, as shown in FIG. 5, it was confirmed that phosphorus was present in the surface layer in each example. Moreover, it was found out that the contents of the coating elements such as phosphorus and aluminum were higher on the surface of the cathode active material than those in the interior thereof, and the contents were continuously changed from the surface to the interior, and phosphorus was present from the surface to a depth of approximately 150 nm in an inward direction.

Next, secondary batteries shown in FIGS. 1 and 2 were formed using the formed cathode active materials. At first, the formed cathode active material powder and lithium carbonate powder were mixed at a weight ratio of the cathode active material:lithium carbonate=95:5 to form a mixture, and the mixture, amorphous carbon powder (ketjen black) as an electrical conductor and polyvinylidene fluoride as a binder were mixed at a weight ratio of the mixture:amorphous carbon powder:polyvinylidene fluoride=94:3:3 to form a cathode mixture. Next, the cathode mixture was dispersed in N-methyl-2-pyrrolidone as a solvent to form cathode mixture slurry, and the cathode mixture slurry was uniformly applied to both sides of the cathode current collector 21A made of strip-shaped aluminum foil with a thickness of 20 μm, and the cathode mixture slurry was dried, and compression molded by a roller press to form the cathode active material layer 21B, thereby the cathode 21 was formed. After that, the cathode lead 25 made of aluminum was attached to an end of the cathode current collector 21A.

Moreover, spherical graphite powder with an average particle diameter of 30 μm as an anode active material and polyvinylidene fluoride as a binder were mixed at a weight ratio of the graphite powder:polyvinylidene fluoride=90:10 to form an anode mixture. Next, the anode mixture was dispersed in N-methyl-2-pyrrolidone as a solvent to form anode mixture slurry, and the anode mixture slurry was uniformly applied to both sides of the anode current collector 22A made of strip-shaped copper foil with a thickness of 15 μm, and the anode mixture slurry was hot-press molded to form the anode active material layer 22B, thereby the anode 22 was formed. After that, the anode lead 26 made of nickel was attached to an end of the anode current collector 22A. At that time, the amounts of the cathode active material and the anode active material were adjusted, and were designed so that the open circuit voltage at a fully charged state was 4.40 V, and the capacity of the anode 22 was represented by a capacity component by insertion and extraction of lithium.

After the cathode 21 and the anode 22 were formed, the microporous separator 23 was prepared, and the anode 22, the separator 23, the cathode 21 and separator 23 were laminated in this order to form a laminate, and the laminate was spirally wound several times to form the jelly-roll type spirally wound electrode body 20.

After the spirally wound electrode body 20 was formed, the spirally wound electrode body 20 was sandwiched between a pair of insulating plates 12 and 13, and the anode lead 26 was welded to the battery can 11, and the cathode lead 25 was welded to the safety valve mechanism 15, thereby the spirally wound electrode body 20 was contained in the battery can 11 made of nickel-plated iron. After that, 4.0 g of the electrolytic solution was injected into the battery can 11 by a decompression system. As the electrolytic solution, an electrolytic solution formed by dissolving 1.0 mo/kg of $LiPF_6$ as an electrolyte salt in a solvent which was formed by mixing ethylene carbonate, dimethyl carbonate and vinylene carbonate at a weight ratio of ethylene carbonate:dimethyl carbonate:vinylene carbonate=35:64:1 was used.

After the electrolytic solution was injected into the battery can 11, the battery can 11 was caulked by the gasket 17 to fix the safety valve mechanism 15, the PTC device 16 and the battery cover 14, thereby cylindrical secondary batteries with an outside diameter of 18 mm and a height of 65 mm were obtained.

Moreover, as Comparative Example 1-1 relative to Examples 1-1 to 1-5, a secondary battery was formed as in the case of Examples 1-1 to 1-5, except that the lithium complex oxide particles (mean chemical composition $Li_{1.03}Co_{0.98}Al_{0.01}Mg_{0.01}O_2$) used in the central section in Examples 1-1 to 1-5 were used as it is without forming the surface layer.

As Comparative Example 1-2, a secondary battery was formed as in the case of Examples 1-1 to 1-5, except that a mixture of the lithium complex oxide (mean chemical composition $Li_{1.03}Co_{0.98}Al_{0.01}Mg_{0.01}O_2$) used in the central section in Examples 1-1 to 1-5 and a phosphorus-containing compound ($LiMn_{0.65}Fe_{0.35}PO_4$) used in the surface layer in Example 1-5 at a weight ratio of the lithium complex oxide: the phosphorus-containing compound=98:2 was used as a cathode active material.

As Comparative Example 1-3, a secondary battery was formed as in the case of Examples 1-1 to 1-5, except that after 1 kg of the lithium complex oxide particles used in the central section in Examples 1-1 to 1-5 were added and stirred in a solution formed by dissolving 110.5 g of aluminum nitrate nonahydrate ($Al(NO_3)_3 \cdot 9H_2O$) in pure water for approximately 1 hour to form a solid-liquid mixture, the solid-liquid mixture was dried at 200° C., and was heated for 5 hours at 800° C. to form the surface layer to form the cathode active material.

The formed secondary batteries of Examples 1-1 to 1-5 and Comparative Examples 1-1 to 1-3 were charged and discharged to determine their rated capacities and cycle characteristics. After the secondary batteries were charged at 23° C. at a constant current of 2000 mA until the battery voltage reached 4.4 V, the secondary batteries were charged at a constant voltage until the total charge time at a constant voltage reached 3 hours, thereby the secondary batteries were fully charged. The secondary batteries were discharged at 23° C. at a constant current of 2000 mA until the battery voltage reached 2.75 V, thereby the secondary batteries were fully discharged. The charge-discharge cycle was repeated, and the discharge capacity in the second cycle was regarded as the rated capacity. Moreover, as the cycle characteristics, the ratio of the discharge capacity in the 200th cycle to the rated capacity was determined by (discharge capacity in the 200 cycle/rated capacity)×100. The obtained results are shown in Table 1.

arranged, the discharge capacity retention ratio could not be sufficiently improved to higher than 90%.

In other words, it was found out that even if the open circuit voltage in a fully charged state was 4.25 V or higher, when the cathode active material in which the surface layer including phosphorus was arranged was used, a high energy density could be obtained, and the cycle characteristics could be improved.

Examples 2-1 to 2-3

Cathode active materials were formed by the following steps. At first, nickel sulfate, cobalt sulfate and manganese sulfate were mixed as solutions to form a mixture, and ammonia water and a sodium hydroxide solution were dropped in the mixture while stirring to form a nickel-cobalt-manganese complex hydroxide, and the nickel-cobalt-manganese complex hydroxide was mixed with lithium hydroxide to form a mixture, and the mixture was heated for 10 hours at 900° C. in an oxygen stream to synthesize a nickel-cobalt-manganese complex oxide. When the obtained fired body was analyzed by atomic absorption spectrometry, the composition of the fired body was $Li_{1.02}Ni_{0.1}Co_{0.8}Mn_{0.1}O_2$. Moreover, the nickel-cobalt-manganese complex oxide was similar to the pattern of $LiCoO_2$ in the JCPDS (Joint Committee of Powder Diffraction Standard) file card No. 50-0653, so it was confirmed that the same bedded salt structure as that of $LiCoO_2$ was formed in the nickel-cobalt-manganese complex oxide. Next, the nickel-cobalt-manganese complex oxide was pulverized into powder, and the powder of the nickel-cobalt manganese complex oxide was used as the central section. When the particle diameter of the formed central section was measured by a laser diffraction method, the average particle diameter was 13 μm. Further, when the powder was observed by a scanning electron microscope (SEM), spherical particles

TABLE 1

| | LITHIUM COMPLEX OXIDE IN CENTRAL SECTION | ELEMENT INCLUDED IN SURFACE LAYER | CHARGE VOLTAGE (V) | RATED CAPACITY (Wh) | DISCHARGE CAPACITY RETENTION RATIO (%) |
|---|---|---|---|---|---|
| EXAMPLE 1-1 | $Li_{1.03}Co_{0.98}Al_{0.01}Mg_{0.01}O_2$ | Al, Co, O, P | 4.4 | 9.01 | 91 |
| EXAMPLE 1-2 | | Mg, Co, O, P | | 8.99 | 92 |
| EXAMPLE 1-3 | | Co, O, P | | 9.00 | 91 |
| EXAMPLE 1-4 | | Zn, O, P | | 8.81 | 92 |
| EXAMPLE 1-5 | | Mn, Fe, O, P | | 8.85 | 91 |
| COMPARATIVE EXAMPLE 1-1 | $Li_{1.03}Co_{0.98}Al_{0.01}Mg_{0.01}O_2$ | — | 4.4 | 9.17 | 80 |
| COMPARATIVE EXAMPLE 1-2 | $Li_{1.03}Co_{0.98}Al_{0.01}Mg_{0.01}O_2$ $LiMn_{0.65}Fe_{0.35}PO_4$ | — | | 9.03 | 83 |
| COMPARATIVE EXAMPLE 1-3 | $Li_{1.03}Co_{0.98}Al_{0.01}Mg_{0.01}O_2$ | Al, Co, O | | 9.01 | 88 |

As shown in Table 1, in Examples 1-1 to 1-5 in which the surface layer was arranged in the cathode active material, compared to Comparative Example 1-1 in which the surface layer was not arranged and only the central section was used, the rated capacity declined by the rated capacity of the surface layer; however, the discharge capacity retention ratio could be substantially improved. On the other hand, in Comparative Example 1-2 in which the lithium complex oxide and the phosphorus-containing compound were simply mixed, the discharge capacity retention ratio could be improved, but the degree of improvement was small, compared to Examples 1-1 to 1-5. Moreover, in Comparative Example 1-3 in which the surface layer made of an oxide including aluminum was in which primary particles with a diameter of 0.1 μm to 5 μm were agglomerated were observed.

Next, the surface layer was formed on the central section. At that time, in Example 2-1, after 5 g of lithium phosphate ($Li_3PO_4$) and 21.8 g of cobalt phosphate octahydrate ($CO_3(PO_4)_2 \cdot 8H_2O$) were mixed, and were pulverized in pure water as a dispersion medium by a bead mill method to form slurry containing a solid portion with an average particle diameter of 0.8 μm, 1 kg of the lithium complex oxide particles as the central section was added and stirred in the slurry to form a solid-liquid mixture, and the solid-liquid mixture was dried at 200° C., and was heated for 5 hours at 800° C. to form the surface layer.

In Example 2-2, after 5.3 g of lithium hydroxide.monohydrate (LiOH.H$_2$O), 11.8 g of nickel hydroxide (Ni(OH)$_2$) and 17.1 g of diammonium hydrogen phosphate ((NH$_4$)$_2$HPO$_4$) were mixed, and pulverized in pure water as a dispersion medium by a bead mill method to form slurry containing a solid portion with an average particle diameter of 0.8 µm, 1 kg of the lithium complex oxide particles as the central section was added and stirred in the slurry to form a solid-liquid mixture, and the solid-liquid mixture was dried at 200° C., and was heated for 5 hours at 800° C. to form the surface layer.

In Example 2-3, after 9.7 g of lithium phosphate (Li$_3$PO$_4$) and 33.3 g of magnesium phosphate octahydrate (Mg$_3$(PO$_4$)$_2$.8H$_2$O) were mixed, and were pulverized in pure water as a dispersion medium by a bead mill method to form slurry containing a solid portion with an average particle diameter of 0.8 µm, 1 kg of the lithium complex oxide particles as the central section were added and stirred in the slurry to form a solid-liquid mixture, and the solid-liquid mixture was dried at 200° C., and was heated for 5 hours at 800° C. to form the surface layer.

When the formed cathode active materials of Examples 2-1 to 2-3 were analyzed as in the case of Examples 1-1 to 1-5, it was confirmed that a phosphorus-containing compound was present in the surface layer. After that, secondary batteries were formed using the formed cathode active materials as in the case of Examples 1-1 to 1-5.

Moreover, as Comparative Examples 2-1 to 2-3 relative to Examples 2-1 to 2-3, secondary batteries were formed as in the case of Examples 2-1 to 2-3, except that the lithium complex oxide particles used in the central section in Examples 2-1 to 2-3 were used as it is without forming the surface layer.

Further, as Comparative Example 2-4, a secondary battery was formed as in the case of Examples 2-1 to 2-3, except that a mixture of the lithium complex oxide (Li$_{1.02}$Ni$_{0.1}$Co$_{0.8}$Mn$_{0.1}$O$_2$) used in the central section in Examples 2-1 to 2-3 and a phosphorus-containing compound (LiMgPO$_4$) at a weight ratio of the lithium complex oxide:the phosphorus-containing compound=97:3 was used as a cathode active material. At that time, the phosphorus-containing compound was synthesized by mixing lithium phosphate (Li$_3$PO$_4$) and magnesium phosphate octahydrate (Mg$_3$PO$_4$)$_2$.8H$_2$O) at a molar ratio of 1:1 to form a mixture, pulverizing the mixture in pure water as a dispersion medium by a bead mill method, drying the mixture at 200° C., and heating the mixture for 5 hours at 800° C. When the X-ray diffraction measurement of the obtained phosphorus-containing compound was carried out, it was confirmed that the phosphorus-containing compound had an olivine structure.

The formed secondary batteries of Examples 2-1 to 2-3 and Comparative Examples 2-1 to 2-4 were charged and discharged as in the case of Examples 1-1 to 1-5, except that the charge voltage was changed, thereby the rated capacities and the cycle characteristics of the secondary batteries were determined. The charge voltage was 4.4 V in Example 2-1 and Comparative Example 2-1, 4.5 V in Example 2-2 and Comparative Example 2-2, and 4.6 V in Example 2-3 and Comparative Examples 2-3 and 2-4. The obtained results are shown in Table 2.

TABLE 2

| | LITHIUM COMPLEX OXIDE IN CENTRAL SECTION | ELEMENT INCLUDED IN SURFACE LAYER | CHARGE VOLTAGE (V) | RATED CAPACITY (Wh) | DISCHARGE CAPACITY RETENTION RATIO (%) |
|---|---|---|---|---|---|
| EXAMPLE 2-1 | Li$_{1.02}$Ni$_{0.1}$Co$_{0.8}$Mn$_{0.1}$O$_2$ | Co, O, P | 4.4 | 8.93 | 91 |
| EXAMPLE 2-2 | | Ni, O, P | 4.5 | 9.63 | 88 |
| EXAMPLE 2-3 | | Mg, O, P | 4.6 | 10.01 | 86 |
| COMPARATIVE EXAMPLE 2-1 | Li$_{1.02}$Ni$_{0.1}$Co$_{0.8}$Mn$_{0.1}$O$_2$ | — | 4.4 | 9.03 | 81 |
| COMPARATIVE EXAMPLE 2-2 | | — | 4.5 | 9.75 | 52 |
| COMPARATIVE EXAMPLE 2-3 | | — | 4.6 | 10.18 | 32 |
| COMPARATIVE EXAMPLE 2-4 | Li$_{1.02}$Ni$_{0.1}$Co$_{0.8}$Mn$_{0.1}$O$_2$ LiMgPO$_4$ | — | 4.6 | 9.98 | 32 |

As shown in Table 2, in Examples 2-1 to 2-3 in which the surface layer was arranged in the cathode active material, compared to Comparative Examples 2-1 to 2-3 in which the surface layer was not arranged, and only the central section was used, the discharge capacity retention ratio could be substantially improved. In particular, the higher the charge voltage was, the higher the effect became. On the other hand, in Comparative Example 2-4 in which the lithium complex oxide and the phosphorus-containing compound were simply mixed, when the charge voltage was increased, the discharge capacity retention ratio could not be improved.

In other words, it was found out that even if the open circuit voltage in a fully charged state was 4.25 V or more, when the cathode active material on which the surface layer including phosphorus was arranged was used, a high energy density could be obtained, and the cycle characteristics could be improved, and the higher the open circuit voltage was, the higher the effect could be obtained.

Examples 3-1 to 3-9, Comparative Examples 3-1, 3-2

Cathode active materials were formed by the following steps. At first, a cobalt compound CO$_3$O$_4$ and a lithium salt Li$_2$CO$_3$ were uniformly mixed so that the molar ratio of lithium and cobalt became Li:Co=1.05:1. Next, the above-described mixture was heated for 5 hours at 900° C. in air to form lithium cobalt oxide (LiCoO$_2$). When the powder X-ray diffraction measurement of lithium cobalt oxide (LiCoO$_2$) was carried out as in the case of Examples 1-1 to 1-5, the diffraction pattern peak of the lithium cobalt oxide closely matched a peak of lithium cobalt oxide (LiCoO$_2$) listed in the JCPDS file. Next, the lithium cobalt complex oxide (LiCoO$_2$) was pulverized to form powder with a particle diameter of 14 µm at 50% cumulative size.

Next, a compound of phosphorus and aluminum was arranged on the surface of the lithium cobalt oxide ($LiCoO_2$). At that time, in Example 3-1, 34.9 g of aluminum lactate was dissolved in 1 L of pure water, and 1 kg of lithium cobalt oxide ($LiCoO_2$) was added and stirred to form a solution. Next, a mixture formed by dissolving 15.7 g of diammonium hydrogen phosphate in pure water was dropped in the solution, and the solution was further stirred for approximately 1 hour to form a solid-liquid mixture. The formed solid-liquid mixture was dried and heated for 10 hours at 700° C. to form the cathode active material.

In Example 3-2, a cathode active material was formed as in the case of Example 3-1, except that the amount of aluminum lactate was 23.3 g, and the amount of diammonium hydrogen phosphate was 20.9 g.

In Example 3-3, a cathode active material was formed as in the case of Example 3-1, except that the amount of aluminum lactate was 17.4 g, and the amount of diammonium hydrogen phosphate was 23.5 g.

In Example 3-4, a cathode active material was formed as in the case of Example 3-1, except that the amount of aluminum lactate was 11.6 g, and the amount of diammonium hydrogen phosphate was 26.1 g.

In Example 3-5, a cathode active material was formed as in the case of Example 3-1, except that the amount of aluminum lactate was 4.36 g, and the amount of diammonium hydrogen phosphate was 29.4 g.

In Example 3-6, a cathode active material was formed as in the case of Example 3-1, except that the amount of aluminum lactate was 2.44 g, and the amount of diammonium hydrogen phosphate was 1.09 g.

In Example 3-7, a cathode active material was formed as in the case of Example 3-1, except that the amount of aluminum lactate was 4.88 g, the amount of diammonium hydrogen phosphate was 2.19 g.

In Example 3-8, a cathode active material was formed as in the case of Example 3-1, except that the amount of aluminum lactate was 75.4 g, and the amount of diammonium hydrogen phosphate was 33.8 g.

In Example 3-9, a cathode active material was formed as in the case of Example 3-1, except that the amount of aluminum lactate was 101.5 g, and the amount of diammonium hydrogen phosphate was 45.6 g.

As Comparative Example 3-1 relative to Examples 3-1 to 3-9, a cathode active material was formed as in the case of Examples 3-1 to 3-9, except that aluminum lactate and diammonium hydrogen phosphate were not used, and a lithium complex oxide ($Li_{1.03}Co_{0.98}Al_{0.01}Mg_{0.01}O_2$) was stirred in pure water. Moreover, as Comparative Example 3-2, a cathode active material was formed as in the case of Example 3-1 to 3-9, except that aluminum lactate was not used, and only 31.3 g of diammonium hydrogen phosphate was used.

Figure 6:
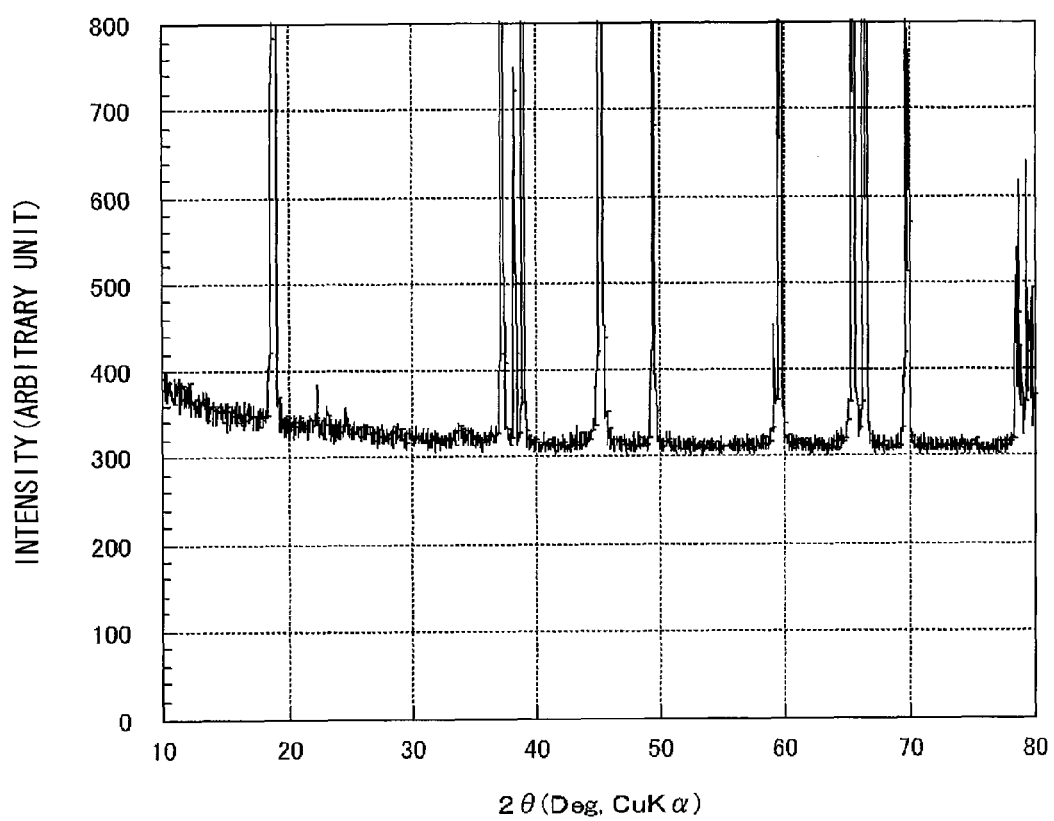
FIG. 6 is an X-ray diffraction diagram by CuK α radiation of a cathode active material used in Example 3-1.
Figure 7:
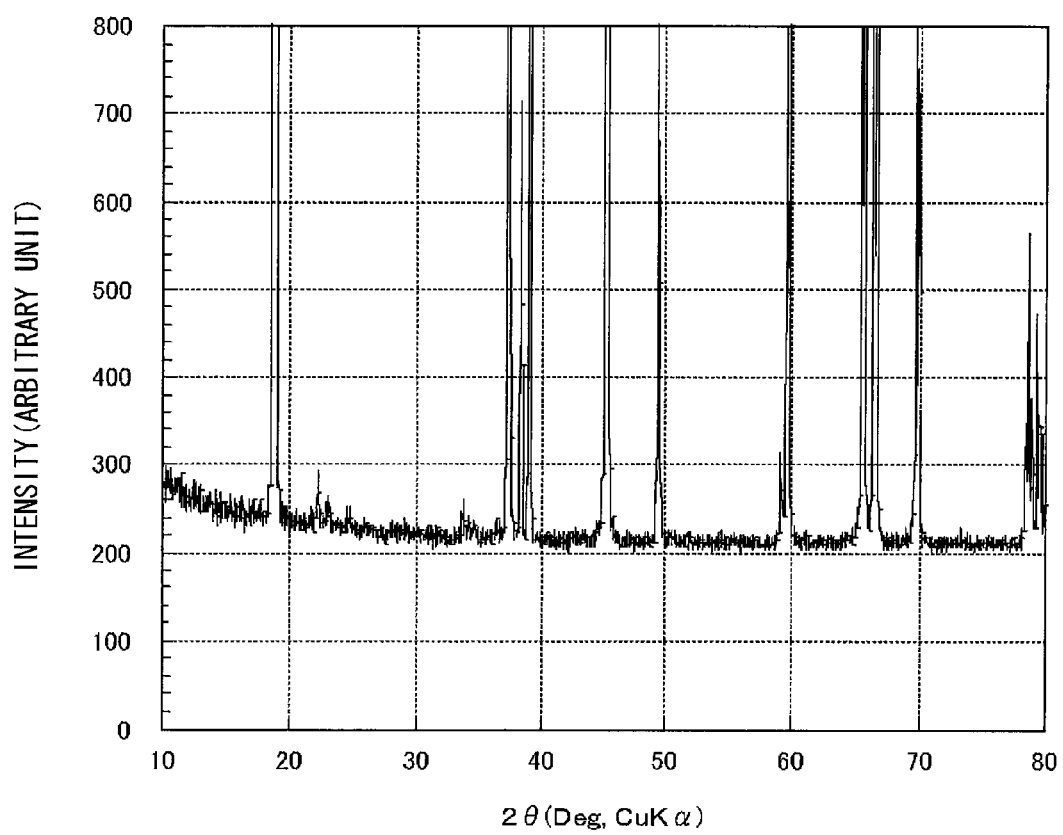
FIG. 7 is an X-ray diffraction diagram by CuK α radiation of a cathode active material used in Example 3-2.
Figure 8:
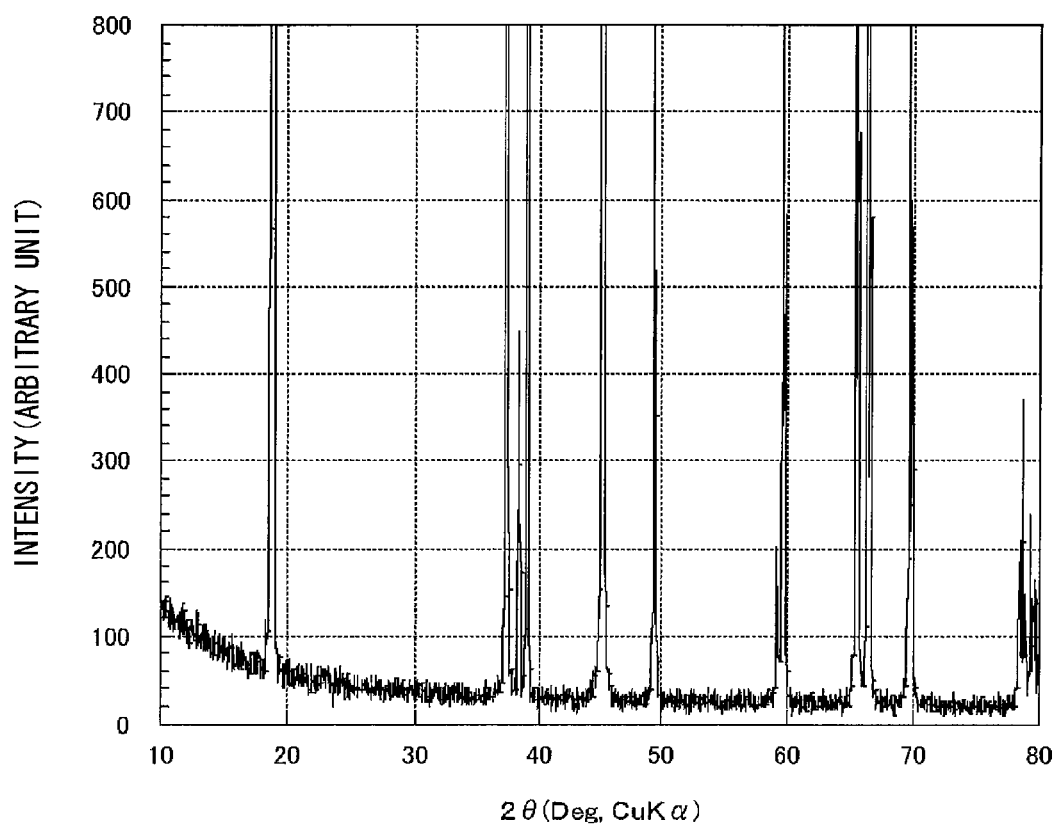
FIG. 8 is an X-ray diffraction diagram by CuK α radiation of a cathode active material used in Comparative Example 3-1.

The powder X-ray diffraction measurement of the cathode active materials of Examples 3-1 and 3-2 and Comparative Example 3-1 was carried out as in the case of Examples 1-1 to 1-5. The results are shown in FIGS. 6, 7 and 8. As a result, it was found out that the cathode active materials of Examples 3-1 and 3-2 shown in FIGS. 6 and 7 had diffraction peaks at 22° to 22.5°, 23° to 23.5° and 24.5° to 25° in a diffraction spectrum using CuK α radiation in addition to a diffraction peak of the cathode active material of Comparative Example 3-1 shown in FIG. 8.

Next, secondary batteries shown in FIGS. 1 and 2 were formed using the formed cathode active materials of Examples 3-1 to 3-9 and Comparative Examples 3-1 and 3-2. At that time, the secondary batteries were formed as in the case of Examples 1-1 to 1-5, except that as a cathode mixture, a mixture of 86 wt % of the formed cathode active material, 10 wt % of graphite as an electrical conductor and 4 wt % of polyvinylidene fluoride (PVdF) as a binder was used, and as the anode current collector 22A, copper foil with a thickness of 10 μm was used, and as the electrolytic solution, an electrolytic solution formed by dissolving 1 mol/dm$^3$ of $LiPF_6$ in a mixture solvent including ethylene carbonate and diethyl carbonate at a volume mixture ratio of 1:1 was used.

The formed secondary batteries of Examples 3-1 to 3-9 and Comparative Examples 3-1 and 3-2 were charged and discharged as in the case of Examples 1-1 to 1-5, except that the charge voltage was changed, thereby the rated capacities and the cycle characteristics of the secondary batteries were determined. At that time, the secondary batteries were charged and discharged in a 23° C. environment and a 45° C. environment.

Moreover, the cathode active materials of Examples 3-1 to 3-9 and Comparative Examples 3-1 and 3-2 were bonded to indium metal foil, and ESCA (Electron Spectroscopy for Chemical Analysis) was carried out under the following conditions so as to measure a surface elemental ratio P/Al.
(Conditions of ESCA)
Measurement device: X-ray photoelectron spectrometer Quantera of ULVAC-PHI, Inc. SXMX radiation source monochromated Al—Kα radiation (1486.6 eV)
X-ray beam diameter: 100 μm
X-ray output: 25 W
Electron neutralization condition: use an electron flood gun and an argon gun for neutralization with an "Auto" mode
Path energy: 112 eV
Step Size: 0.2 eV
Scan number: 20 times The measurement results of the surface elemental ratios and the coating amounts in the cathode active materials used in Examples 3-1 to 3-9 and Comparative Examples 3-1 and 3-2, and the initial capacities and the retention ratios of the formed batteries are shown in Tables 3 to 6. The upper limit charge voltage was 4.55 V in Table 3, 4.40 V in Table 4, 4.30 V in Table 5 and 4.20 V in Table 6.

TABLE 3

| | Upper limit charge voltage: 4.55 [V] | | | | |
|---|---|---|---|---|---|
| | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| EXAMPLE 3-1 | 0.35 | 2.4 | 9.67 | 84 | 69 |
| EXAMPLE 3-2 | 0.51 | 2.4 | 9.68 | 83 | 69 |
| EXAMPLE 3-3 | 0.95 | 2.4 | 9.67 | 84 | 70 |
| EXAMPLE 3-4 | 2.03 | 2.4 | 9.67 | 83 | 70 |
| EXAMPLE 3-5 | 12.7 | 2.4 | 9.67 | 80 | 66 |
| EXAMPLE 3-6 | 0.35 | 0.17 | 9.71 | 77 | 52 |

TABLE 3-continued

| | Upper limit charge voltage: 4.55 [V] | | | | |
|---|---|---|---|---|---|
| | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| EXAMPLE 3-7 | 0.35 | 0.34 | 9.72 | 79 | 55 |
| EXAMPLE 3-8 | 0.35 | 5.1 | 9.41 | 86 | 71 |
| EXAMPLE 3-9 | 0.35 | 6.8 | 9.11 | 86 | 72 |
| COMPARATIVE EXAMPLE 3-1 | — | — | 9.72 | 68 | 35 |
| COMPARATIVE EXAMPLE 3-2 | — | 2.4 | 9.67 | 77 | 52 |

TABLE 4

| | Upper limit charge voltage: 4.40 [V] | | | | |
|---|---|---|---|---|---|
| | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| EXAMPLE 3-1 | 0.35 | 2.4 | 9.00 | 90 | 80 |
| EXAMPLE 3-2 | 0.51 | 2.4 | 9.01 | 91 | 82 |
| EXAMPLE 3-3 | 0.95 | 2.4 | 9.01 | 91 | 83 |
| EXAMPLE 3-4 | 2.03 | 2.4 | 9.01 | 91 | 83 |
| EXAMPLE 3-5 | 12.7 | 2.4 | 9.01 | 90 | 76 |
| EXAMPLE 3-6 | 0.35 | 0.17 | 9.15 | 85 | 67 |
| EXAMPLE 3-7 | 0.35 | 0.34 | 9.15 | 87 | 75 |
| EXAMPLE 3-8 | 0.35 | 5.1 | 8.71 | 91 | 82 |
| EXAMPLE 3-9 | 0.35 | 6.8 | 8.45 | 91 | 83 |
| COMPARATIVE EXAMPLE 3-1 | — | — | 9.17 | 80 | 51 |
| COMPARATIVE EXAMPLE 3-2 | — | 2.4 | 9.00 | 85 | 65 |

TABLE 5

| | Upper limit charge voltage: 4.30 [V] | | | | |
|---|---|---|---|---|---|
| | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| EXAMPLE 3-1 | 0.35 | 2.4 | 8.53 | 93 | 88 |
| EXAMPLE 3-2 | 0.51 | 2.4 | 8.53 | 94 | 90 |
| EXAMPLE 3-3 | 0.95 | 2.4 | 8.53 | 94 | 90 |
| EXAMPLE 3-4 | 2.03 | 2.4 | 8.53 | 94 | 90 |
| EXAMPLE 3-5 | 12.7 | 2.4 | 8.53 | 93 | 84 |
| EXAMPLE 3-6 | 0.35 | 0.17 | 8.70 | 91 | 78 |
| EXAMPLE 3-7 | 0.35 | 0.34 | 8.68 | 91 | 82 |
| EXAMPLE 3-8 | 0.35 | 5.1 | 8.25 | 93 | 88 |
| EXAMPLE 3-9 | 0.35 | 6.8 | 8.01 | 93 | 90 |
| COMPARATIVE EXAMPLE 3-1 | — | — | 8.71 | 88 | 70 |
| COMPARATIVE EXAMPLE 3-2 | — | 2.4 | 8.53 | 90 | 78 |

TABLE 6

| | Upper limit charge voltage: 4.20 [V] | | | | |
|---|---|---|---|---|---|
| | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| EXAMPLE 3-1 | 0.35 | 2.4 | 8.11 | 94 | 91 |
| EXAMPLE 3-2 | 0.51 | 2.4 | 8.11 | 94 | 92 |
| EXAMPLE 3-3 | 0.95 | 2.4 | 8.10 | 94 | 92 |

TABLE 6-continued

Upper limit charge voltage: 4.20 [V]

|  | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
|---|---|---|---|---|---|
| EXAMPLE 3-4 | 2.03 | 2.4 | 8.10 | 94 | 92 |
| EXAMPLE 3-5 | 12.7 | 2.4 | 8.10 | 94 | 89 |
| EXAMPLE 3-6 | 0.35 | 0.17 | 8.27 | 93 | 85 |
| EXAMPLE 3-7 | 0.35 | 0.34 | 8.25 | 93 | 87 |
| EXAMPLE 3-8 | 0.35 | 5.1 | 7.85 | 94 | 91 |
| EXAMPLE 3-9 | 0.35 | 6.8 | 7.63 | 94 | 91 |
| COMPARATIVE EXAMPLE 3-1 | — | — | 8.29 | 93 | 81 |
| COMPARATIVE EXAMPLE 3-2 | — | 2.4 | 8.09 | 94 | 87 |

As shown in Tables 3 to 6, it was found out that when a compound of phosphorus and aluminum was included on the particle surface of the lithium complex oxide, the cycle characteristics could be improved. Moreover, in the case where the atomic ratio (P/Al) of phosphorus to aluminum was 0.3 or more, higher characteristics could be obtained.

Further, when the amount of the compound of phosphorus and aluminum on the surface was too small, a cycle improvement effect was small, and when the amount was too large, the initial capacity was pronouncedly reduced. Therefore, it was found out that phosphorus and aluminum were preferably included within a range from 0.2 mol % to 6.0 mol % both inclusive in total relative to the lithium complex oxide particles.

Examples 4-1 to 4-9, Comparative Examples 4-1, 4-2

After the cathode 33 and the anode 34 were formed as in the case of Examples 3-1 to 3-9 and Comparative Examples 3-1 and 3-2, secondary batteries shown in FIGS. 3 and 4 were formed. At first, the cathode lead 31 made of aluminum was attached to an end of the cathode current collector 33A, and the anode lead 32 made of nickel was attached to an end of the anode current collector 34A. Next, the electrolyte layer 36 formed by holding the electrolytic solution in a copolymer of polyvinylidene fluoride and hexafluoropropylene was arranged on the cathode 33 and the anode 34. As the electrolytic solution, an electrolytic solution formed by dissolving 0.8 mol/kg of $LiPF_6$ as an electrolyte salt in a mixture of 60 wt % of ethylene carbonate and 40 wt % of propylene carbonate as a nonaqueous solvent was used.

Next, after the cathode 33 on which the electrolyte layer 36 was formed and the anode 34 on which the electrolyte layer 36 was formed were laminated with the separator 35 in between, they were spirally wound several times to form the spirally wound electrode body 30. After that, while the cathode lead 31 and the anode lead 32 were drawn to outside, the spirally wound electrode body 30 was sealed in the package members 40 made of a laminate film under reduced pressure to form the secondary batteries with a thickness of 3.8 mm, a width of 34 mm and a height of 50 mm.

The formed secondary batteries of Examples 4-1 to 4-9 and Comparative Examples 4-1 and 4-2 were charged and discharged as in the case of Examples 1-1 to 1-5, except that the content current during charge and discharge was 700 mA, and the charge voltage was changed, thereby the rated capacities and the cycle characteristics of the secondary batteries were determined. At that time, the secondary batteries were charged and discharged in a 23° C. environment and a 45° C. environment. Moreover, the surface elemental ratios and the coating amounts were measured as in the case of Examples 3-1 to 3-9 and Comparative Examples 3-1 and 3-2. The results are shown in Tables 7 to 10. The upper limit charge voltage was 4.55 V in Table 7, 4.40 V in Table 8, 4.30 V in Table 9 and 4.20 V in Table 10.

TABLE 7

Upper limit charge voltage: 4.55 [V]

|  | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
|---|---|---|---|---|---|
| EXAMPLE 4-1 | 0.35 | 2.4 | 3.13 | 85 | 70 |
| EXAMPLE 4-2 | 0.51 | 2.4 | 3.13 | 85 | 70 |
| EXAMPLE 4-3 | 0.95 | 2.4 | 3.13 | 85 | 71 |
| EXAMPLE 4-4 | 2.03 | 2.4 | 3.12 | 86 | 71 |
| EXAMPLE 4-5 | 12.7 | 2.4 | 3.13 | 82 | 68 |
| EXAMPLE 4-6 | 0.35 | 0.17 | 3.17 | 79 | 58 |
| EXAMPLE 4-7 | 0.35 | 0.34 | 3.16 | 80 | 66 |
| EXAMPLE 4-8 | 0.35 | 5.1 | 3.05 | 88 | 72 |
| EXAMPLE 4-9 | 0.35 | 6.8 | 3.00 | 88 | 73 |
| COMPARATIVE EXAMPLE 4-1 | — | — | 3.19 | 69 | 40 |
| COMPARATIVE EXAMPLE 4-2 | — | 2.4 | 3.12 | 79 | 57 |

TABLE 8

Upper limit charge voltage: 4.40 [V]

|  | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| --- | --- | --- | --- | --- | --- |
| EXAMPLE 4-1 | 0.35 | 2.4 | 2.91 | 91 | 82 |
| EXAMPLE 4-2 | 0.51 | 2.4 | 2.91 | 92 | 83 |
| EXAMPLE 4-3 | 0.95 | 2.4 | 2.91 | 92 | 83 |
| EXAMPLE 4-4 | 2.03 | 2.4 | 2.91 | 92 | 84 |
| EXAMPLE 4-5 | 12.7 | 2.4 | 2.91 | 91 | 78 |
| EXAMPLE 4-6 | 0.35 | 0.17 | 2.96 | 86 | 69 |
| EXAMPLE 4-7 | 0.35 | 0.34 | 2.95 | 88 | 76 |
| EXAMPLE 4-8 | 0.35 | 5.1 | 2.83 | 92 | 84 |
| EXAMPLE 4-9 | 0.35 | 6.8 | 2.77 | 93 | 85 |
| COMPARATIVE EXAMPLE 4-1 | — | — | 2.96 | 82 | 55 |
| COMPARATIVE EXAMPLE 4-2 | — | 2.4 | 2.91 | 86 | 66 |

TABLE 9

Upper limit charge voltage: 4.30 [V]

|  | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| --- | --- | --- | --- | --- | --- |
| EXAMPLE 4-1 | 0.35 | 2.4 | 2.75 | 94 | 89 |
| EXAMPLE 4-2 | 0.51 | 2.4 | 2.75 | 94 | 90 |
| EXAMPLE 4-3 | 0.95 | 2.4 | 2.74 | 94 | 90 |
| EXAMPLE 4-4 | 2.03 | 2.4 | 2.74 | 94 | 90 |
| EXAMPLE 4-5 | 12.7 | 2.4 | 2.76 | 94 | 85 |
| EXAMPLE 4-6 | 0.35 | 0.17 | 2.81 | 92 | 80 |
| EXAMPLE 4-7 | 0.35 | 0.34 | 2.81 | 92 | 83 |
| EXAMPLE 4-8 | 0.35 | 5.1 | 2.69 | 94 | 90 |
| EXAMPLE 4-9 | 0.35 | 6.8 | 2.62 | 94 | 92 |
| COMPARATIVE EXAMPLE 4-1 | — | — | 2.81 | 89 | 72 |
| COMPARATIVE EXAMPLE 4-2 | — | 2.4 | 2.75 | 91 | 80 |

TABLE 10

Upper limit charge voltage: 4.20 [V]

|  | SURFACE P/Al RATIO | COATING AMOUNT [mol %] | INITIAL CAPACITY (23° C.) [Wh] | RETENTION RATIO (23° C.) [%] | RETENTION RATIO (45° C.) [%] |
| --- | --- | --- | --- | --- | --- |
| EXAMPLE 4-1 | 0.35 | 2.4 | 2.62 | 95 | 92 |
| EXAMPLE 4-2 | 0.51 | 2.4 | 2.62 | 95 | 92 |
| EXAMPLE 4-3 | 0.95 | 2.4 | 2.62 | 95 | 92 |
| EXAMPLE 4-4 | 2.03 | 2.4 | 2.61 | 95 | 92 |
| EXAMPLE 4-5 | 12.7 | 2.4 | 2.62 | 95 | 90 |
| EXAMPLE 4-6 | 0.35 | 0.17 | 2.66 | 94 | 87 |
| EXAMPLE 4-7 | 0.35 | 0.34 | 2.65 | 95 | 89 |
| EXAMPLE 4-8 | 0.35 | 5.1 | 2.57 | 95 | 93 |
| EXAMPLE 4-9 | 0.35 | 6.8 | 2.48 | 95 | 93 |
| COMPARATIVE EXAMPLE 4-1 | — | — | 2.66 | 94 | 83 |
| COMPARATIVE EXAMPLE 4-2 | — | 2.4 | 2.62 | 95 | 89 |

As shown in Tables 7 to 10, it was found out that when a compound of phosphorus and aluminum was included on the particle surface of the lithium complex oxide, the cycle characteristics could be improved. Moreover, in the case where the atomic ratio (P/Al) of phosphorus to aluminum on the surface was 0.3 or more, higher characteristics could be obtained.

Further, when the amount of the compound of phosphorus and aluminum on the surface was too small, a cycle improvement effect was small, and when the amount was too large, the initial capacity was pronouncedly reduced. Therefore, phosphorus and aluminum were preferably included within a range from 0.2 mol % to 6.0 mol % both inclusive in total relative to the lithium complex oxide particles.

Examples 5-1 to 5-5, Comparative Examples 5-1 to 5-3

Cathode active materials were formed by the following steps. In Example 5-1, at first, manganese phosphate trihydrate ($Mn_3(PO_4)_2 \cdot 3H_2O$) and lithium phosphate ($Li_3PO_4$) were mixed, and pulverized in pure water as a dispersion medium by a bead mill method to form slurry containing a solid portion with an average particle diameter of 0.3 μm. Lithium complex oxide particles with an average composition of $Li_{1.03}Co_{0.98}Al_{0.01}Mg_{0.01}O_2$ and an average particle diameter of 13 μm by a laser scattering method was added and stirred in the slurry to form a solid-liquid mixture, and the solid-liquid mixture was dried at 200° C., and heated for 5 hours at 800° C., and then slowly cooled, thereby the cathode active material was formed. At that time, the coating amounts of manganese and phosphorus were 2.0 mol % relative to the lithium complex oxide powder.

In Example 5-2, the cathode active material was formed as in the case of Example 5-1, except that the coating amounts of manganese and phosphorus were 3.0 mol % and 2.0 mol % relative to the lithium complex oxide powder, respectively.

In Example 5-3, the cathode active material was formed as in the case of Example 5-1, except that the coating amounts of manganese and phosphorus were 2.0 mol % and 3.0 mol % relative to the lithium complex oxide powder, respectively.

In Example 5-4, the cathode active material was formed as in the case of Example 5-1, except that manganese phosphate trihydrate and lithium carbonate ($Li_2CO_3$) were mixed, and the coating amounts of manganese, phosphorus and lithium were 3.0 mol %, 2.0 mol % and 3.0 mol % relative to the lithium complex oxide powder, respectively.

In Example 5-5, the cathode active material was formed as in the case of Example 5-1, except that manganese phosphate trihydrate was used, and lithium phosphate was not used, thereby the coating amounts of manganese and phosphorus were 3.0 mol % and 2.0 mol % relative to the lithium complex oxide powder, respectively.

Figure 9:
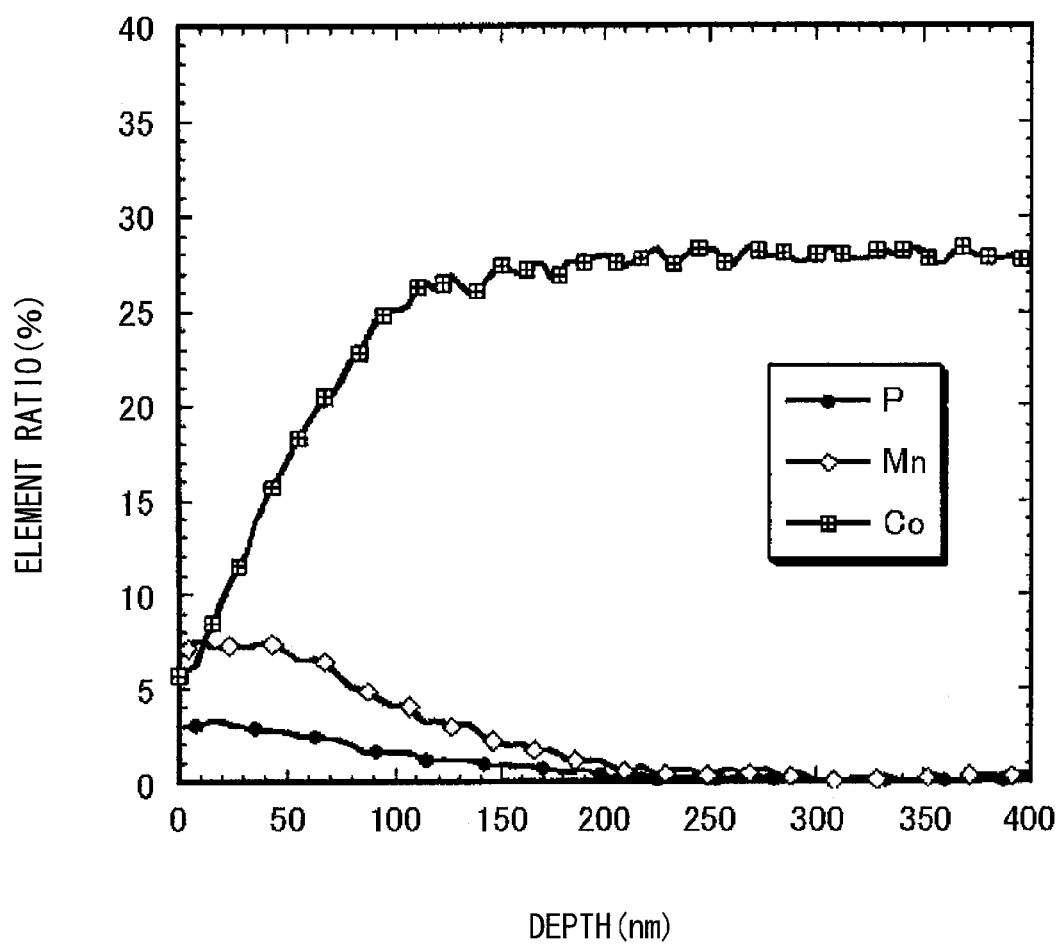
FIG. 9 is a plot showing a change in an element composition ratio by Auger electro spectroscopy in a depth direction of a cathode active material of Example 5-1.

The element composition of the surface of the formed cathode active material of Example 5-1 and the element distribution in a depth direction of the cathode active material were measured as in the case of Examples 1-1 to 1-5. The results are shown in FIG. 9. Thereby, it was found out that while the contents of phosphorus and manganese were decreased from the surface to the interior, the content of cobalt was increased.

Next, secondary batteries were formed using the formed cathode active materials of Examples 5-1 to 5-5 as in the case of Examples 3-1 to 3-9.

Moreover, as Comparative Example 5-1 relative to Examples 5-1 to 5-5, a secondary battery was formed as in the case of Examples 5-1 to 5-5, except that a cathode active material was formed by using the lithium complex oxide particles ($Li_{1.03}Co_{0.98}Al_{0.01}Mg_{0.01}O_2$) stirred in water.

Further, as Comparative Examples 5-2 and 5-3, secondary batteries were formed as in the case of Examples 5-1 to 5-5, except that a mixture of the lithium complex oxide particles ($Li_{1.03}Co_{0.98}Al_{0.01}Mg_{0.01}O_2$) used in Examples 5-1 to 5-5 and a solution formed by dissolving diammonium hydrogen phosphate (($NH_4)_2HPO_4$) in pure water was used as a cathode active material. At that time, the coating amount of phosphorus was 1.0 mol % in Comparative Example 5-2 and 3.0 mol % in Comparative Example 5-3 relative to the lithium complex oxide powder.

The initial capacities, the capacity retention ratios in the 200th cycle at high temperature and the capacity retention ratios at low temperature of the formed secondary batteries of Examples 5-1 to 5-5 and Comparative Examples 5-1 to 5-3 were determined by the following steps.

<Initial Capacity>

After the secondary batteries were charged at a constant current and a constant voltage on condition that the environmental temperature was 23° C., the charge current was 1000 mA, the charge voltage was 4.4 V and the charge time was 3 hours, the secondary batteries were discharged at a constant current on condition that the environmental temperature 23° C., the discharge current was 800 mA, and the end voltage was 3.0 V, thereby the initial capacities of the secondary batteries were measured. The results are shown in Table 11.

<Capacity Retention Ratio in 200th Cycle at High Temperature>

After the secondary batteries were charged at a constant current and a constant voltage on condition that the environmental temperature was 45° C., the charge current was 1000 mA, the charge voltage was 4.4 V and the charge time was 3 hours, the secondary batteries were discharged at a constant current on condition that the environmental temperature was 45° C., the discharge current was 800 mA and the end voltage was 3.0 V, thereby the initial capacities of the secondary batteries were measured. Next, the cycle of charge and discharge on the same conditions as those in the case where the initial capacities were measured was repeated, and then the discharge capacities in the 200th cycle were measured. Then, the capacity retention ratios in the 200th cycle relative to the initial capacities of the secondary batteries were determined. The results are shown in Table 11.

<Capacity Retention Ratio at Low Temperature>

After the secondary batteries were charged at a constant current and a constant voltage on condition that the environmental temperature was 23° C., the charge current was 1000 mA, the charge voltage was 4.4 V and the charge time was 3 hours, the secondary batteries were discharged at a constant current on condition that the environmental temperature was −20° C. to 23° C., the discharge current was 2400 mA and the end voltage was 3.0 V, and then the discharge capacities of the secondary batteries at each temperature were measured. Next, the discharge capacity retention ratios at environmental temperatures of 0°, −10° C. and −20° C. relative to the discharge capacities at 23° C. of the secondary batteries were determined. The results are shown in Table 11.

Moreover, the initial capacities, the capacity retention ratios in the 200th cycle at high temperature and the capacity retention ratios at low temperature of the secondary batteries of Example 5-1 and Comparative Example 5-1 were determined by the same steps as those described above, except that the charge voltage was changed to 4.20 V, 4.30 V, 4.40 V, 4.50 V and 4.60 V. The results are shown in Table 12.

TABLE 11

Lithium complex oxide: $Li_{1.03}Co_{0.98}Al_{0.01}Mg_{0.01}O_2$
Upper limit charge voltage: 4.40 [V]

| | COATING ELEMENT [mol %] | | | INITIAL CAPACITY (23° C.) | CAPACITY RETENTION RATIO AT HIGH TEMPERATURE | CAPACITY RETENTION RATIO AT LOW TEMPERATURE [%] | | |
|---|---|---|---|---|---|---|---|---|
| | Mn | P | Li | [Wh] | [%] (45° C.) | 0° C. | −10° C. | −20° C. |
| EXAMPLE 5-1 | 2.0 | 2.0 | 2.0 | 9.62 | 72.8 | 88.5 | 81.4 | 66.2 |
| EXAMPLE 5-2 | 3.0 | 2.0 | 2.0 | 9.54 | 71.7 | 87.6 | 78.5 | 63.8 |
| EXAMPLE 5-3 | 2.0 | 3.0 | 3.0 | 9.51 | 73.4 | 89.4 | 81.9 | 66.3 |
| EXAMPLE 5-4 | 3.0 | 2.0 | 3.0 | 9.56 | 75.2 | 89.2 | 82.0 | 67.1 |
| EXAMPLE 5-5 | 3.0 | 2.0 | — | 9.58 | 70.1 | 87.2 | 81.1 | 66.8 |
| COMPARATIVE EXAMPLE 5-1 | — | — | — | 9.89 | 51.4 | 83.7 | 71.9 | 55.9 |
| COMPARATIVE EXAMPLE 5-2 | — | 1.0 | — | 9.53 | 57.8 | 79.2 | 70.4 | 54.1 |
| COMPARATIVE EXAMPLE 5-3 | — | 3.0 | — | 9.29 | 64.0 | 81.7 | 70.1 | 54.8 |

TABLE 12

| | LITHIUM COMPLEX OXIDE | COATING ELEMENT [mol %] | | UPPER LIMIT CHARGE VOLTAGE [V] | INITIAL CAPACITY (23° C.) [Wh] | CAPACITY RETENTION RATIO AT HIGH TEMPERATURE [%] (45° C.) | CAPACITY RETENTION RATIO AT LOW TEMPERATURE [%] | | |
|---|---|---|---|---|---|---|---|---|---|
| | | Mn | P | | | | 0° C. | −10° C. | −20° C. |
| EXAMPLE 5-1 | $Li_{1.03}Co_{0.98}Al_{0.01}Mg_{0.01}O_2$ | 2.0 | 2.0 | 4.60 | 10.52 | 65.8 | 89.5 | 83.8 | 67.0 |
| COMPARATIVE EXAMPLE 5-1 | $Li_{1.03}Co_{0.98}Al_{0.01}Mg_{0.01}O_2$ | — | — | 4.60 | 10.86 | 31.4 | 83.1 | 72.9 | 54.9 |
| EXAMPLE 5-1 | $Li_{1.03}Co_{0.98}Al_{0.01}Mg_{0.01}O_2$ | 2.0 | 2.0 | 4.50 | 10.22 | 67.7 | 89.7 | 84.4 | 67.3 |
| COMPARATIVE EXAMPLE 5-1 | $Li_{1.03}Co_{0.98}Al_{0.01}Mg_{0.01}O_2$ | — | — | 4.50 | 10.75 | 38.1 | 83.1 | 72.9 | 54.9 |
| EXAMPLE 5-1 | $Li_{1.03}Co_{0.98}Al_{0.01}Mg_{0.01}O_2$ | 2.0 | 2.0 | 4.40 | 9.62 | 72.8 | 88.5 | 81.4 | 66.2 |
| COMPARATIVE EXAMPLE 5-1 | $Li_{1.03}Co_{0.98}Al_{0.01}Mg_{0.01}O_2$ | — | — | 4.40 | 9.89 | 45.1 | 83.7 | 71.9 | 55.9 |
| EXAMPLE 5-1 | $Li_{1.03}Co_{0.98}Al_{0.01}Mg_{0.01}O_2$ | 2.0 | 2.0 | 4.30 | 9.35 | 74.2 | 89.9 | 84.0 | 66.8 |
| COMPARATIVE EXAMPLE 5-1 | $Li_{1.03}Co_{0.98}Al_{0.01}Mg_{0.01}O_2$ | — | — | 4.30 | 9.65 | 47.4 | 83.2 | 71.8 | 55.2 |
| EXAMPLE 5-1 | $Li_{1.03}Co_{0.98}Al_{0.01}Mg_{0.01}O_2$ | 2.0 | 2.0 | 4.20 | 9.11 | 75.5 | 89.3 | 83.1 | 66.5 |
| COMPARATIVE EXAMPLE 5-1 | $Li_{1.03}Co_{0.98}Al_{0.01}Mg_{0.01}O_2$ | — | — | 4.20 | 9.51 | 55.8 | 81.6 | 71.5 | 55.5 |

It was obvious from the results in Table 11 that in the case where a compound including phosphorus and manganese or a compound including phosphorus, manganese and lithium was included on the particle surface of the lithium complex oxide, compared to the case where these compounds were not included on the particle surface of the lithium complex oxide, the initial capacity of the secondary battery was slightly decreased, but the capacity retention ratio in the 200th cycle at high temperature and the capacity retention ratio at low temperature were improved. At that time, it was found out that even if the ratio of phosphorus and manganese was changed within a certain range, an effect of improving the capacity retention ratio in the 200th cycle at high temperature and the capacity retention ratio at low temperature could be obtained. Moreover, it was found out that in the case where only phosphorus was included on the particle surface, the capacity retention ratio in 200th cycle at high temperature was not sufficient, and an effect of improving the capacity retention ratio at low temperature was not obtained.

It was obvious from the results in Table 12 that in the case where a compound including phosphorus and manganese was included on the particle surface of the lithium complex oxide, compared to the case where the compound was not included on the particle surface, the initial capacity of the secondary battery was slightly decreased on condition that the upper limit charge voltage was within a range from 4.2 to 4.6 V, but the capacity retention ratio in the 200th cycle at high temperature and the capacity retention ratio at low temperature were improved.

Examples 6-1 to 6-5

Secondary batteries were formed as in the case of Examples 3-1 to 3-9, except that a cathode active material formed by changing the mixture amounts of manganese phosphate trihydrate and lithium phosphate was used. At that time, the coating amounts of manganese and phosphorus relative to the lithium complex oxide powder were equal, and were 5.7 mol % in Example 6-1, 3.0 mol % in Example 6-2, 1.5 mol % in Example 6-3, 0.3 mol % in Example 6-4 and 0.15 mol % in Example 6-5.

The initial capacities, the capacity retention ratios in the 200th cycle at high temperature and the capacity retention ratios at low temperature of the formed secondary batteries of Examples 6-1 to 6-5 were measured as in the case of Examples 5-1 to 5-5. The charge voltage was 4.4 V. The results are shown in Table 13.

TABLE 13

| | LITHIUM COMPLEX OXIDE | COATING ELEMENT [mol %] | | UPPER LIMIT CHARGE VOLTAGE [V] | INITIAL CAPACITY (23° C.) [Wh] | CAPACITY RETENTION RATIO AT HIGH TEMPERATURE [%] (45° C.) | CAPACITY RETENTION RATIO AT LOW TEMPERATURE [%] | | |
|---|---|---|---|---|---|---|---|---|---|
| | | Mn | P | | | | 0° C. | −10° C. | −20° C. |
| EXAMPLE 6-1 | $Li_{1.03}Co_{0.98}Al_{0.01}Mg_{0.01}O_2$ | 5.7 | 5.7 | 4.40 | 8.63 | 66.3 | 85.3 | 74.8 | 58.1 |
| EXAMPLE 6-2 | | 3.0 | 3.0 | | 9.27 | 70.5 | 87.3 | 80.2 | 65.0 |
| EXAMPLE 5-1 | | 2.0 | 2.0 | | 9.62 | 72.8 | 88.5 | 81.4 | 66.2 |
| EXAMPLE 6-3 | | 1.5 | 1.5 | | 9.71 | 73.4 | 89.4 | 81.9 | 66.7 |
| EXAMPLE 6-4 | | 0.3 | 0.3 | | 9.82 | 66.5 | 86.7 | 79.8 | 65.3 |
| EXAMPLE 6-5 | | 0.15 | 0.15 | | 9.85 | 65.2 | 84.8 | 74.2 | 57.3 |

It was obvious from the results in Table 13 that when phosphorus and manganese were added to the lithium complex oxide powder and heated, the capacity retention ratio in the 200th cycle at high temperature and the capacity retention ration at low temperature were improved. Moreover, the coating amounts of manganese and phosphorus were preferably within a range from 0.1 mol % to 6.0 mol % both inclusive relative to the lithium complex oxide powder. It is because when the coating amounts are too small, an effect of improving the capacity retention ration in the 200th cycle at high temperature and the capacity retention ratio at low temperature is not sufficiently obtained, and when the amounts are too large, the initial capacity of the secondary battery is largely reduced.

Example 7, Comparative Example 7

A cathode active material was formed by the following steps. At first, manganese phosphate trihydrate $(Mn_3(PO_4)_2 \cdot 3H_2O)$ and lithium phosphate $(Li_3PO_4)$ were mixed, and were pulverized in pure water as a dispersion medium by a bead mill method to form slurry containing a solid portion with an average particle diameter of 0.4 μm. The lithium complex oxide particles with an average composition of $Li_{1.02}Ni_{0.5}Co_{0.2}Mn_{0.3}O_2$ and an average particle diameter of 12 μm by a laser scattering method was added and stirred in the slurry to form a solid-liquid mixture, and the solid-liquid mixture was dried at 200° C., and heated for 5 hours at 900° C., and then slowly cooled, thereby the cathode active material was formed. At that time, the coating amounts of manganese and phosphorus were 2.0 mol % relative to the lithium complex oxide powder. After that, a secondary battery was formed as in the case of Examples 3-1 to 3-9.

Moreover, as Comparative Example 7 relative to Example 7, a secondary battery was formed as in the case of Example 7, except that after the lithium complex oxide particles $(Li_{1.02}Ni_{0.5}Co_{0.2}Mn_{0.3}O_2)$ used in Example 7 were stirred in water, they were dried at 200° C., and heated for 5 hours at 800° C., and then slowly cooled, thereby a cathode active material was formed.

The initial capacities, the capacity retention ratios in the 200th cycle at high temperature and the capacity retention ratios at low temperature of the formed secondary batteries of Example 7 and Comparative Example 7 were determined as in the case of Example 5-1 and Comparative Example 5-1. The results are shown in Table 14.

TABLE 14

| | LITHIUM COMPLEX OXIDE | COATING ELEMENT [mol %] | | UPPER LIMIT CHARGE VOLTAGE [V] | INITIAL CAPACITY (23° C.) [Wh] | CAPACITY RETENTION RATIO AT HIGH TEMPERATURE [%] (45° C.) | CAPACITY RETENTION RATIO AT LOW TEMPERATURE [%] | | |
|---|---|---|---|---|---|---|---|---|---|
| | | Mn | P | | | | 0° C. | −10° C. | −20° C. |
| EXAMPLE 7 | $Li_{1.02}Ni_{0.5}Co_{0.2}Mn_{0.3}O_2$ | 2.0 | 2.0 | 4.60 | 9.42 | 72.8 | 85.3 | 80.1 | 65.1 |
| COMPARATIVE EXAMPLE 7 | $Li_{1.02}Ni_{0.5}Co_{0.2}Mn_{0.3}O_2$ | — | — | 4.60 | 9.82 | 37.3 | 78.2 | 71.1 | 52.7 |
| EXAMPLE 7 | $Li_{1.02}Ni_{0.5}Co_{0.2}Mn_{0.3}O_2$ | 2.0 | 2.0 | 4.50 | 9.15 | 75.9 | 85.1 | 80.7 | 64.1 |
| COMPARATIVE EXAMPLE 7 | $Li_{1.02}Ni_{0.5}Co_{0.2}Mn_{0.3}O_2$ | — | — | 4.50 | 9.54 | 39.1 | 77.5 | 70.8 | 51.4 |
| EXAMPLE 7 | $Li_{1.02}Ni_{0.5}Co_{0.2}Mn_{0.3}O_2$ | 2.0 | 2.0 | 4.40 | 8.58 | 81.8 | 86.4 | 81.1 | 64.6 |
| COMPARATIVE EXAMPLE 7 | $Li_{1.02}Ni_{0.5}Co_{0.2}Mn_{0.3}O_2$ | — | — | 4.40 | 8.94 | 48.1 | 82.1 | 70.3 | 50.8 |
| EXAMPLE 7 | $Li_{1.02}Ni_{0.5}Co_{0.2}Mn_{0.3}O_2$ | 2.0 | 2.0 | 4.30 | 8.27 | 84.2 | 85.2 | 79.8 | 61.7 |
| COMPARATIVE EXAMPLE 7 | $Li_{1.02}Ni_{0.5}Co_{0.2}Mn_{0.3}O_2$ | — | — | 4.30 | 8.72 | 56.4 | 80.5 | 69.5 | 51.4 |
| EXAMPLE 7 | $Li_{1.02}Ni_{0.5}Co_{0.2}Mn_{0.3}O_2$ | 2.0 | 2.0 | 4.20 | 8.15 | 85.5 | 84.8 | 78.0 | 63.6 |
| COMPARATIVE EXAMPLE 7 | $Li_{1.02}Ni_{0.5}Co_{0.2}Mn_{0.3}O_2$ | — | — | 4.20 | 8.50 | 79.3 | 76.1 | 68.3 | 50.7 |

It was obvious from the results in Table 14 that in the case where the lithium complex oxide with an average composition represented by $Li_{1.02}Ni_{0.5}Co_{0.2}Mn_{0.3}O_2$ was used as the lithium complex oxide used for the central section, and a compound including phosphorus, manganese and lithium was included on the particle surface of the lithium complex oxide, compared to the case where the compound was not included, the initial capacity of the secondary battery was slightly decreased on condition that the upper limit charge voltage was within a range from 4.2 V to 4.6 V both inclusive, but the capacity retention ratio in the 200th cycle at high temperature and the capacity retention ratio at low temperature were improved.

Example 8, Comparative Example 8

A cathode active material was formed by the following steps. At first, manganese phosphate trihydrate and lithium phosphate were mixed, and were pulverized in pure water as a dispersion medium by a bead mill method to form slurry containing a solid portion with an average particle diameter of 0.4 μm. The lithium complex oxide particles having an spinel structure with an average composition of $Li_{1.05}Mn_{1.85}Al_{0.1}O_4$ and an average particle diameter of 15 μm in by a laser scattering method was added and stirred in the slurry to form a solid-liquid mixture, and the solid-liquid mixture was dried at 200° C., and heated for 5 hours at 800° C., and then slowly cooled, thereby the cathode active material was formed. At that time, the coating amounts of manganese and phosphorus were 2.0 mol % relative to the lithium complex oxide powder. After that, a secondary battery was formed as in the case of Examples 3-1 to 3-9.

Moreover, as Comparative Example 8 relative to Example 8, a secondary battery was formed as in the case of Examples 3-1 to 3-9, except that after the lithium complex oxide particles ($Li_{1.05}Mn_{1.85}Al_{0.1}O_4$) used in Example 8 was put into water and stirred, they were dried at 200° C. and heated for 5 hours at 800° C., and then slowly cooled to form a cathode active material.

The initial capacities and the capacity retention ratios at low temperature of the formed secondary batteries of Example 8 and Comparative Example 8 were measured by the following steps.

<Initial Capacity>

After the secondary batteries were charged at a constant current and a constant voltage on condition that the environmental temperature was 23° C., the charge voltage was 4.2 V, the charge current was 800 mA and the charge time was 2.5 hours, the secondary batteries were discharged at a constant current on condition that the environmental temperature was 23° C., the discharge current was 500 mA and the end voltage was 3.0 V to measure the initial capacities of the secondary batteries. The results are shown in Table 15.

<Capacity Retention Ratio at Low Temperature>

After the secondary batteries were charged at a constant current and a constant voltage on condition that the environmental temperature was 23° C., the discharge voltage was 4.2 V, the charge current was 800 mA, and the charge time was 2.5 hours, the secondary batteries were discharged at a constant current on condition that the environmental temperature was −20° C. to 23° C., the discharge current was 500 mA and the end voltage was 3.0 V to measure the discharge capacities of the secondary batteries at each temperature. Next, the capacity retention ratios at environmental temperatures of 0° C., −10° C. and −20° C. to the discharge capacities at an environmental temperature of 23° C. of the secondary batteries were determined. The results are shown in Table 15.

TABLE 15

| | LITHIUM COMPLEX OXIDE | COATING ELEMENT [mol %] | | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|
| | | Mn | P | | | 0° C. | −10° C. | −20° C. |
| EXAMPLE 8 | $Li_{1.05}Mn_{1.85}Al_{0.1}O_4$ | 2.0 | 2.0 | 4.20 | 6.27 | 87.1 | 72.6 | 32.9 |
| COMPARATIVE EXAMPLE 8 | $Li_{1.05}Mn_{1.85}Al_{0.1}O_4$ | — | — | 4.20 | 6.45 | 80.5 | 57.5 | 24.4 |

It was obvious from the results in Table 15 that in the case where a lithium complex oxide with a spinel structure was used as the lithium complex oxide used in the central section, and a compound including phosphorus, manganese and lithium was included on the surface of the lithium complex oxide, compared to the case where the compound was not included on the surface, the initial capacity was slightly decreased, but the capacity retention ratio at low temperature was improved.

Examples 9-1 to 9-6, Comparative Examples 9-1, 9-2

Cathode active materials were formed by the following steps. In Example 9-1, 55.16 g of magnesium phosphate octahydrate ($(Mg_3PO_4)_2 \cdot 8H_2O$) and 15.99 g of lithium phosphate ($Li_3PO_4$) were mixed, and were pulverized in pure water as a dispersion medium by a bead mill method to form slurry containing a solid portion with an average particle diameter of 0.4 μm. Then, 1 kg of the lithium complex oxide particles with an average particle diameter of 13 μm by a laser scattering method was added and stirred in the slurry to form a solid-liquid mixture, and the solid-liquid mixture was dried at 200° C., and heated for 5 hours at 800° C., and then slowly cooled to form the cathode active material. At that time, the coating amounts of magnesium and phosphorus were 3.8 mol % relative to the lithium complex oxide.

In Example 9-2, a cathode active material was formed as in the case of Example 9-1, except that 44.83 g of magnesium phosphate octahydrate and 13.00 g of lithium phosphate were mixed, and the coating amounts of magnesium and phosphorus were 3.1 mol % relative to the lithium complex oxide.

In Example 9-3, a cathode active material was formed as in the case of Example 9-1, except that 33.28 g of magnesium phosphate octahydrate and 9.65 g of lithium phosphate were mixed, and the coating amounts of magnesium and phosphorus were 2.3 mol % relative to the lithium complex oxide.

In Example 9-4, a secondary battery was formed as in the case of Example 9-1, except that 10.87 g of magnesium phosphate octahydrate and 3.15 g of lithium phosphate were mixed, and the coating amounts of magnesium and phosphorus were 0.8 mol % relative to lithium complex oxide.

In Example 9-5, a cathode active material was formed as in the case of Example 9-1, except that 5.41 g of magnesium phosphate octahydrate and 1.57 g of lithium phosphate were mixed, and the coating amounts of magnesium and phosphorus were 0.4 mol % relative to the lithium complex oxide.

In Example 9-6, a cathode active material was formed as in the case of Example 9-1, except that 6.37 g of magnesium phosphate octahydrate and 21.96 g of lithium phosphate were mixed, and the coating amounts of magnesium and phosphorus were 0.15 mol % relative to the lithium complex oxide.

Figure 10:
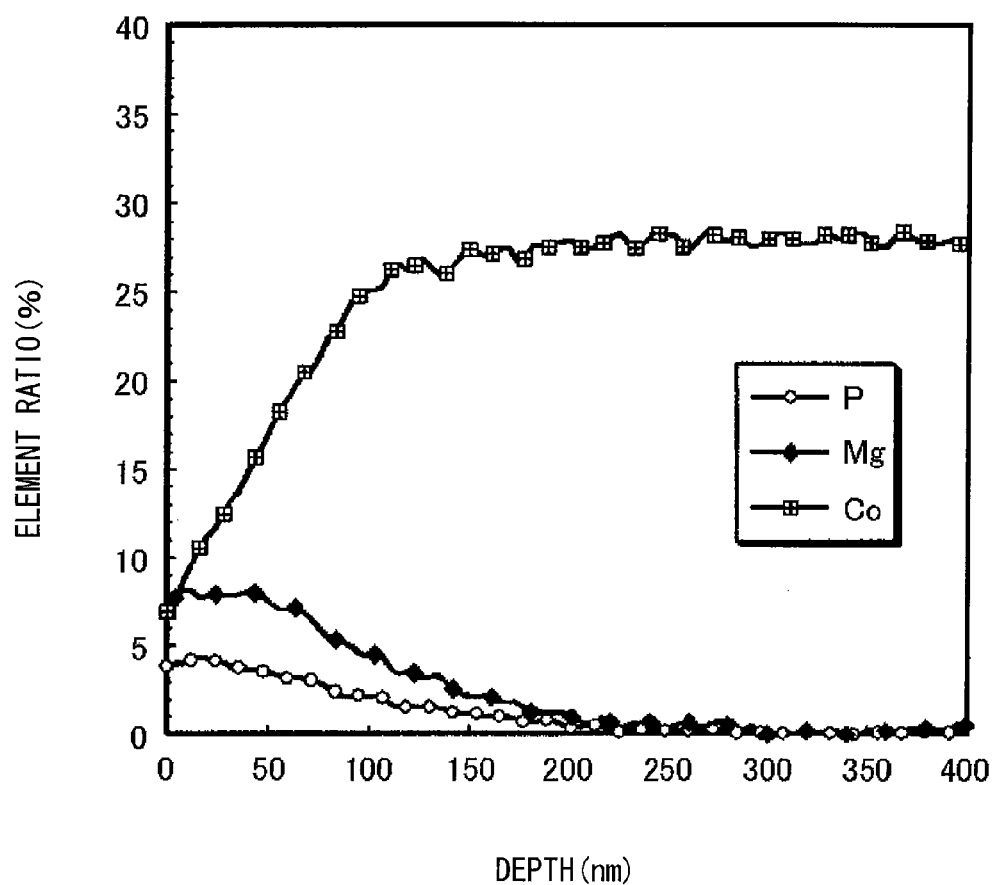
FIG. 10 is a plot showing a change in an element composition ratio by Auger electron spectroscopy in a depth direction of a cathode active material of Example 9-3.

The element composition of the surface of the formed cathode active material of Example 9-3 and the element distribution in a depth direction of the cathode active material were measured as in the case of Examples 1-1 to 1-5. The results are shown in FIG. 10. Thereby, it was found out that while the contents of phosphorus and manganese were decreased from the surface to the interior, the content of cobalt was increased.

Next, secondary batteries were formed using the formed cathode active materials of Examples 9-1 to 9-6 as in the case of Examples 3-1 to 3-9.

As Comparative Example 9-1 relative to Examples 9-1 to 9-6, a secondary battery was formed as in the case of Examples 9-1 to 9-6, except that after the lithium complex oxide ($Li_{1.03}Co_{0.98}Al_{0.01}Mg_{0.01}O_4$) used in Examples 9-1 to 9-3 was put into water, and stirred, the lithium complex oxide was dried at 200° C., and heated for 5 hours at 800° C. to form a cathode active material.

Moreover, as Comparative Example 9-2 relative to Examples 9-1 to 9-6, a secondary battery was formed as in the case of Examples 9-1 to 9-6, except that 1 kg of the lithium complex oxide ($Li_{1.03}Co_{0.98}Al_{0.01}Mg_{0.01}O_4$) used in Examples 9-1 to 9-6 was added and stirred in a solution formed by dissolving 41.9 g of diammonium hydrogen phosphate in pure water, the lithium complex oxide was dried at 200° C., and heated for 5 hours at 800° C. to form a cathode active material. At that time, the coating amount of phosphorus was 3.0 mol % relative to the lithium complex oxide powder.

The initial capacities and the capacity retention ratios at low temperature of the formed secondary batteries of Example 9-1 to 9-6 and Comparative Examples 9-1 and 9-2 were measured by the following steps.

<Initial Capacity>

After the secondary batteries were charged at a constant current and a constant voltage on condition that the environmental temperature was 23° C., the charge current was 1000 mA and the upper limit charge voltage was 4.2 V to 4.6 V, the secondary batteries were discharged at a constant current on condition that the environmental temperature was 23° C., the discharge current was 2400 mA and the end voltage was 3.0 V to measure the discharge capacities of the secondary batteries. The results are shown in Table 16.

<Capacity Retention Ratio at Low Temperature>

After the secondary batteries were charged at a constant current and a constant voltage on condition that the environmental temperature was 23° C., the charge current was 1000 mA and the upper limit voltage was 4.2 V to 4.6 V, the secondary batteries were discharged at a constant current on condition that the environmental temperature was −20° C. to 23° C., the discharge current was 2400 mA and the end voltage was 3.0 V to measure the discharge capacities of the secondary batteries at each temperature. Next, the capacity retention ratios at environmental temperatures of 0° C., −10° C. and −20° C. to the discharge capacities at an environmental temperature of 23° C. of the secondary batteries were measured. The results are shown in Table 16.

TABLE 16

| | LITHIUM COMPLEX OXIDE | COATING ELEMENT [mol %] | | SURFACE P/Mg RATIO | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|---|
| | | Mg | P | | | | 0° C. | −10° C. | −20° C. |
| EXAMPLE 9-1 | $Li_{1.03}Co_{0.98}Al_{0.01}Mg_{0.01}O_2$ | 3.8 | 3.8 | 0.60 | 4.60 | 10.03 | 83.5 | 73.6 | 57.1 |
| EXAMPLE 9-2 | | 3.1 | 3.1 | 0.58 | | 10.28 | 88.3 | 83.4 | 66.2 |
| EXAMPLE 9-3 | | 2.3 | 2.3 | 0.57 | | 10.52 | 89.5 | 83.8 | 67.0 |
| EXAMPLE 9-4 | | 0.8 | 0.8 | 0.55 | | 10.78 | 88.0 | 80.4 | 66.3 |
| EXAMPLE 9-5 | | 0.4 | 0.4 | 0.54 | | 10.80 | 87.7 | 78.8 | 62.3 |
| EXAMPLE 9-6 | | 0.15 | 0.15 | 0.48 | | 10.82 | 84.5 | 73.7 | 58.1 |
| COMPARATIVE EXAMPLE 9-1 | $Li_{1.03}Co_{0.98}Al_{0.01}Mg_{0.01}O_2$ | — | — | — | 4.60 | 10.86 | 83.1 | 72.9 | 54.9 |
| COMPARATIVE EXAMPLE 9-2 | | — | 3.0 | — | | 10.27 | 80.8 | 69.1 | 53.4 |
| EXAMPLE 9-1 | $Li_{1.03}Co_{0.98}Al_{0.01}Mg_{0.01}O_2$ | 3.8 | 3.8 | 0.60 | 4.50 | 9.71 | 83.7 | 73.7 | 57.1 |
| EXAMPLE 9-2 | | 3.1 | 3.1 | 0.58 | | 10.07 | 88.6 | 83.7 | 67.0 |
| EXAMPLE 9-3 | | 2.3 | 2.3 | 0.57 | | 10.22 | 89.7 | 84.4 | 67.3 |
| EXAMPLE 9-4 | | 0.8 | 0.8 | 0.55 | | 10.48 | 88.9 | 80.8 | 66.8 |
| EXAMPLE 9-5 | | 0.4 | 0.4 | 0.54 | | 10.58 | 88.4 | 78.8 | 62.3 |
| EXAMPLE 9-6 | | 0.15 | 0.15 | 0.48 | | 10.70 | 84.7 | 73.9 | 58.4 |
| COMPARATIVE EXAMPLE 9-1 | $Li_{1.03}Co_{0.98}Al_{0.01}Mg_{0.01}O_2$ | — | — | — | 4.50 | 10.75 | 83.1 | 72.9 | 54.9 |
| COMPARATIVE EXAMPLE 9-2 | | — | 3.0 | — | | 9.98 | 81.6 | 68.9 | 52.9 |
| EXAMPLE 9-1 | $Li_{1.03}Co_{0.98}Al_{0.01}Mg_{0.01}O_2$ | 3.8 | 3.8 | 0.60 | 4.40 | 8.94 | 83.9 | 74.0 | 58.8 |
| EXAMPLE 9-2 | | 3.1 | 3.1 | 0.58 | | 9.34 | 89.5 | 83.4 | 66.2 |
| EXAMPLE 9-3 | | 2.3 | 2.3 | 0.57 | | 9.58 | 89.9 | 83.7 | 66.8 |
| EXAMPLE 9-4 | | 0.8 | 0.8 | 0.55 | | 9.82 | 88.6 | 78.8 | 65.9 |
| EXAMPLE 9-5 | | 0.4 | 0.4 | 0.54 | | 9.84 | 88.1 | 78.1 | 64.3 |

TABLE 16-continued

| | LITHIUM COMPLEX OXIDE | COATING ELEMENT [mol %] | | SURFACE P/Mg RATIO | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|---|
| | | Mg | P | | | | 0° C. | −10° C. | −20° C. |
| EXAMPLE 9-6 | | 0.15 | 0.15 | 0.48 | | 9.86 | 84.7 | 73.9 | 58.2 |
| COMPARATIVE EXAMPLE 9-1 | $Li_{1.03}Co_{0.98}Al_{0.01}Mg_{0.01}O_2$ | — | — | — | 4.40 | 9.89 | 83.7 | 71.9 | 55.9 |
| COMPARATIVE EXAMPLE 9-2 | | — | 3.0 | — | | 9.29 | 81.7 | 70.1 | 54.8 |
| EXAMPLE 9-1 | $Li_{1.03}Co_{0.98}Al_{0.01}Mg_{0.01}O_2$ | 3.8 | 3.8 | 0.60 | 4.30 | 8.70 | 83.5 | 73.9 | 57.4 |
| EXAMPLE 9-2 | | 3.1 | 3.1 | 0.58 | | 9.21 | 89.7 | 83.4 | 65.8 |
| EXAMPLE 9-3 | | 2.3 | 2.3 | 0.57 | | 9.35 | 89.9 | 84.0 | 66.8 |
| EXAMPLE 9-4 | | 0.8 | 0.8 | 0.55 | | 9.59 | 88.3 | 83.4 | 65.3 |
| EXAMPLE 9-5 | | 0.4 | 0.4 | 0.54 | | 9.60 | 87.7 | 82.3 | 64.8 |
| EXAMPLE 9-6 | | 0.15 | 0.15 | 0.48 | | 9.62 | 84.8 | 73.7 | 58.1 |
| COMPARATIVE EXAMPLE 9-1 | $Li_{1.03}Co_{0.98}Al_{0.01}Mg_{0.01}O_2$ | — | — | — | 4.30 | 9.65 | 83.2 | 71.8 | 55.2 |
| COMPARATIVE EXAMPLE 9-2 | | — | 3.0 | — | | 9.20 | 81.6 | 70.2 | 52.9 |
| EXAMPLE 9-1 | $Li_{1.03}Co_{0.98}Al_{0.01}Mg_{0.01}O_2$ | 3.8 | 3.8 | 0.60 | 4.20 | 8.82 | 82.1 | 73.6 | 57.0 |
| EXAMPLE 9-2 | | 3.1 | 3.1 | 0.58 | | 9.05 | 88.7 | 82.7 | 66.1 |
| EXAMPLE 9-3 | | 2.3 | 2.3 | 0.57 | | 9.11 | 89.3 | 83.1 | 66.5 |
| EXAMPLE 9-4 | | 0.8 | 0.8 | 0.55 | | 9.19 | 88.5 | 82.1 | 65.9 |
| EXAMPLE 9-5 | | 0.4 | 0.4 | 0.54 | | 9.45 | 88.0 | 80.8 | 64.8 |
| EXAMPLE 9-6 | | 0.15 | 0.15 | 0.48 | | 9.47 | 82.5 | 73.6 | 57.1 |
| COMPARATIVE EXAMPLE 9-1 | $Li_{1.03}Co_{0.98}Al_{0.01}Mg_{0.01}O_2$ | — | — | — | 4.20 | 9.51 | 81.6 | 71.5 | 55.5 |
| COMPARATIVE EXAMPLE 9-2 | | — | 3.0 | — | | 9.02 | 79.0 | 69.5 | 53.0 |

It was obvious from the results in Table 16 that in the case where a compound including phosphorus and magnesium was added to the lithium complex oxide powder, compared to the case where the compound was not added, the initial capacity was slightly decreased, but the capacity retention ratio at low temperature was improved. Moreover, the coating amounts of phosphorus and magnesium were preferably within a range from 0.1 mol % to 4.0 mol % both inclusive. It is because when the amounts are too small, the capacity retention ratio at low temperature is decreased, and when the amounts are too large, a decline in the initial capacity is pronounced.

Example 10, Comparative Example 10

A cathode active material was formed by the following steps. At first, 33.28 g of magnesium phosphate octahydrate and 9.65 g of lithium phosphate were mixed to form slurry containing a solid portion with an average particle diameter of 0.4 μm. The lithium complex oxide particles with an average composition of $Li_{1.02}Ni_{0.5}Co_{0.2}Mn_{0.3}O_2$ and an average particle diameter of 12 μm by a laser scattering method was added and stirred in the slurry to from a solid-liquid mixture, and the solid-liquid mixture was dried at 200° C., and heated for 5 hours at 900° C., and then slowly cooled to form the cathode active material. At that time, the coating amounts of magnesium and phosphorus were 2.3 mol % relative to the lithium complex oxide. After that, a secondary battery was obtained as in the case of Examples 3-1 to 3-9.

Moreover, as Comparative Example 10 relative to Example 10, a secondary battery was formed as in the case of Example 10, except that after the lithium complex oxide $Li_{1.02}Ni_{0.5}Co_{0.2}Mn_{0.3}O_2$ used in Example 10 was put into water and stirred, the lithium complex oxide was dried at 200° C., and heated for 5 hours at 900° C. to form a cathode active material.

The initial capacities and the capacity retention ratios at low temperature of the formed secondary batteries of Example 10 and Comparative Example 10 were determined as in the case of Example 9-1. The results are shown in Table 17.

TABLE 17

| | LITHIUM COMPLEX OXIDE | COATING ELEMENT [mol %] | | SURFACE P/Mg RATIO | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|---|
| | | Mg | P | | | | 0° C. | −10° C. | −20° C. |
| EXAMPLE 10 | $Li_{1.02}Ni_{0.5}Co_{0.2}Mn_{0.3}O_2$ | 2.3 | 2.3 | 0.55 | 4.60 | 9.42 | 88.3 | 80.0 | 64.6 |
| COMPARATIVE EXAMPLE 10 | $Li_{1.02}Ni_{0.5}Co_{0.2}Mn_{0.3}O_2$ | — | — | — | 4.60 | 9.82 | 82.2 | 71.3 | 52.7 |
| EXAMPLE 10 | $Li_{1.02}Ni_{0.5}Co_{0.2}Mn_{0.3}O_2$ | 2.3 | 2.3 | 0.55 | 4.50 | 9.15 | 87.6 | 79.8 | 63.1 |
| COMPARATIVE EXAMPLE 10 | $Li_{1.02}Ni_{0.5}Co_{0.2}Mn_{0.3}O_2$ | — | — | — | 4.50 | 9.54 | 80.5 | 57.5 | 51.4 |

TABLE 17-continued

|  | LITHIUM COMPLEX OXIDE | COATING ELEMENT [mol %] | | SURFACE P/Mg RATIO | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|---|
|  |  | Mg | P |  |  |  | 0° C. | −10° C. | −20° C. |
| EXAMPLE 10 | $Li_{1.02}Ni_{0.5}Co_{0.2}Mn_{0.3}O_2$ | 2.3 | 2.3 | 0.55 | 4.40 | 8.58 | 87.4 | 80.0 | 63.6 |
| COMPARATIVE EXAMPLE 10 | $Li_{1.02}Ni_{0.5}Co_{0.2}Mn_{0.3}O_2$ | — | — | — | 4.40 | 8.94 | 82.1 | 71.3 | 50.8 |
| EXAMPLE 10 | $Li_{1.02}Ni_{0.5}Co_{0.2}Mn_{0.3}O_2$ | 2.3 | 2.3 | 0.55 | 4.30 | 8.27 | 86.2 | 72.8 | 61.7 |
| COMPARATIVE EXAMPLE 10 | $Li_{1.02}Ni_{0.5}Co_{0.2}Mn_{0.3}O_2$ | — | — | — | 4.30 | 8.72 | 80.5 | 62.5 | 51.4 |
| EXAMPLE 10 | $Li_{1.02}Ni_{0.5}Co_{0.2}Mn_{0.3}O_2$ | 2.3 | 2.3 | 0.55 | 4.20 | 8.15 | 87.4 | 80.0 | 64.6 |
| COMPARATIVE EXAMPLE 10 | $Li_{1.02}Ni_{0.5}Co_{0.2}Mn_{0.3}O_2$ | — | — | — | 4.20 | 8.50 | 81.1 | 70.3 | 50.7 |

It was obvious from the results in Table 17 that in the case where as the lithium complex oxide used in the central section, $Li_{1.02}Ni_{0.5}Co_{0.2}Mn_{0.3}O_2$ was used, and a compound including phosphorus, magnesium and lithium was included on the surface, compared to the case where the compound was not included on the surface, the initial capacity of the battery was slightly decreased, but the capacity retention ratio at low temperature was improved.

Example 11, Comparative Example 11

A cathode active material was formed by the following steps. At first, 27.59 g of magnesium phosphate octahydrate and 8.00 g of lithium phosphate were mixed, and were pulverized in pure water as a dispersion medium by a bead mill method to form slurry containing a solid portion with an average particle diameter of 0.4 μm. The lithium complex oxide particles having an spinel structure with an average composition of $L_{1.05}Mn_{1.85}Al_{0.1}O_4$ and an average particle diameter of 14 μm by a laser scattering method was added and stirred in the slurry to form a solid-liquid mixture, and the solid-liquid mixture was dried at 200° C., and heated for 5 hours at 800° C., and then slowly cooled, thereby the cathode active material was formed. At that time, the coating amounts of magnesium and phosphorus were 3.4 mol % relative to the lithium complex oxide. After that, a secondary battery was formed as in the case of Examples 3-1 to 3-9.

<Initial Capacity>

After the secondary batteries were charged at a constant current and a constant voltage on condition that the environmental temperature was 23° C., the charge voltage was 4.2 V, the charge current was 800 mA and the charge time was 2.5 hours, the secondary batteries were discharged at a constant current on condition that the environmental temperature was 23° C., the discharge current was 500 mA and the end voltage was 3.0 V to measure the initial capacities of the secondary batteries. The results are shown in Table 18.

<Capacity Retention Ratio at Low Temperature>

After the secondary batteries were charged at a constant current and a constant voltage on condition that the environmental temperature was 23° C., the charge voltage was 4.2 V, the charge current was 800 mA, and the charge time was 2.5 hours, the secondary batteries were discharged at a constant current on condition that the environmental temperature was −20° C. to 23° C., the discharge current was 500 mA and the end voltage was 3.0 V to measure the discharge capacities of the secondary batteries at each temperature. Next, the capacity retention ratios at environmental temperatures of 0° C., −10° C. and −20° C. to the discharge capacities at an environmental temperature of 23° C. of the secondary batteries were determined. The results are shown in Table 18.

TABLE 18

|  | LITHIUM COMPLEX OXIDE | COATING ELEMENT [mol %] | | SURFACE P/Mg RATIO | UPPER LIMIT CHARGE VOLTAGE [V] | INITIAL CAPACITY (23° C.) [Wh] | CAPACITY RETENTION RATIO AT LOW TEMPERATURE [%] | | |
|---|---|---|---|---|---|---|---|---|---|
|  |  | Mg | P |  |  |  | 0° C. | −10° C. | −20° C. |
| EXAMPLE 11 | $Li_{1.05}Mn_{1.85}Al_{0.1}O_4$ | 3.4 | 3.4 | 0.53 | 4.20 | 6.46 | 89.4 | 80.0 | 64.6 |
| COMPARATIVE EXAMPLE 11 | $Li_{1.05}Mn_{1.85}Al_{0.1}O_4$ | — | — | — | 4.20 | 6.65 | 81.1 | 70.3 | 50.7 |

Moreover, as Comparative Example 11 relative to Example 11, a secondary battery was formed as in the case of Example 11, except that after the lithium complex oxide ($L_{1.05}Mn_{1.85}Al_{0.1}O_4$) used in the central section in Example 11 was put into water and stirred, the lithium complex oxide was dried at 200° C., and heated for 5 hours at 900° C. to form a cathode active material.

The initial capacities and the capacity retention ratios at low temperature of the formed secondary batteries of Example 11 and Comparative Example 11 were determined by the following steps.

It was obvious from the results in Table 18 that in the case where as the lithium complex oxide used in the central section, $L_{1.05}Mn_{1.85}Al_{0.1}O_4$ with a spinel structure was used, and a compound including phosphorus, magnesium and lithium was included on the surface, compared to the case where the compound was not included on the particle surface, the initial capacity was slightly decreased, but the capacity retention ratio at low temperature was improved.

Although the present invention is described referring to the embodiments and the examples, the invention is not limited to the above-described embodiments and the above-described examples, and can be variously modified. For example, in the above-described embodiment or examples, the case where an electrolytic solution as a liquid electrolyte or a gel electrolyte in which a polymer compound holds an electrolytic solution is used is described; however, any other electrolyte may be used. Examples of the other electrolyte include a polymer electrolyte in which an electrolyte salt is dispersed in a polymer compound having ionic conductivity, an inorganic solid electrolyte made of ion-conducting ceramic, ion-conducting glass or ionic crystal, a molten salt electrolyte, and a mixture thereof.

Moreover, in the above-described embodiments and the above-described examples, a so-called lithium ion secondary battery in which the capacity of the anode is represented by a capacity component by insertion and extraction of lithium is described; however, the invention is applicable to a lithium metal secondary battery in which lithium metal is used as an anode active material, and the capacity of the anode is represented by a capacity component based on precipitation and dissolution of lithium, or a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

Further, in the above-described embodiment and the above-described examples, the secondary battery with a winding configuration is described; however, the invention is applicable to a secondary battery with a configuration in which a cathode and an anode are folded or laminated. In addition, the invention is applicable to a secondary battery of a so-called coin type, a button type, a prismatic type or the like. Further, the invention is applicable to not only secondary batteries but also primary batteries in the same manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A cathode active material comprising:
a lithium complex oxide including lithium (Li) and at least one kind selected from the group consisting of cobalt (Co), nickel (Ni) and manganese (Mn); and
a surface layer formed on a central section of the lithium complex oxide, said surface layer including lithium (Li) PO$_4$, aluminum (Al) and at least one kind selected from the group consisting of nickel (Ni), cobalt (Co), manganese (Mn), iron (Fe), magnesium (Mg) and zinc (Zn), wherein
as the lithium complex oxide, at least one kind selected from the group consisting of compounds represented by Chemical Formulas 1, 2 and 3 is included:

 (Chemical Formula 1)

$Li_xCo_aM1_bO_{2-c}$ (where M1 represents at least one kind selected from the group consisting of nickel (Ni), manganese (Mn), magnesium (Mg), aluminum (Al), boron (B), titanium (Ti), vanadium (V), chromium (Cr), iron, copper (Cu), zinc (Zn), molybdenum (Mo), tin (Sn), calcium (Ca), strontium (Sr), tungsten (W), zirconium (Zr) and silicon (Si), the values of x, a, b and c are within ranges of $0.8 \leq x \leq 1.2$, $0.8 \leq a \leq 1$, $0 \leq b \leq 0.2$ and $-0.1 \leq c \leq 0.2$, respectively);

 (Chemical Formula 2)

$Li_yNi_dM2_eO_{2-f}$ (where M2 represents at least one kind selected from the group consisting of cobalt, manganese, magnesium, aluminum, boron, titanium, vanadium, chromium, iron, copper, zinc, molybdenum, tin, calcium, strontium, tungsten, zirconium and silicon, the values of y, d, e and f are within ranges of $0.8 \leq y \leq 1.2$, $0.3 \leq d \leq 0.98$, $0.02 \leq e \leq 0.7$ and $-0.1 \leq f \leq 0.2$, respectively);

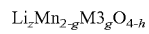 (Chemical Formula 3)

$Li_zMn_{2-g}M3_gO_{4-h}$ (where M3 represents at least one kind selected from the group consisting of cobalt, nickel, magnesium, aluminum, boron, titanium, vanadium, chromium, iron, copper, zinc, molybdenum, tin, calcium, strontium and tungsten, the values of z, g and h are within ranges of $0.8 \leq z \leq 1.2$, $0 \leq g < 1.0$ and $-0.2 \leq h \leq 0.2$, respectively).

2. The cathode active material according to claim 1, wherein
magnesium is included in the surface layer.

3. The cathode active material according to claim 1, wherein the surface layer includes magnesium, and for the surface layer, the elemental phosphorus in PO$_4$ and elemental magnesium is within a range from 0.1 mol % to 4.0 mol % both inclusive relative to the lithium complex oxide.

4. The cathode active material according to claim 1, wherein for the surface layer, an atomic ratio of the elemental phosphorus in PO$_4$ to aluminum (Al) ranges from 0.35 to 12.7 both inclusive.

5. A battery comprising a cathode; an anode; and an electrolyte, wherein
the cathode includes a cathode active material including a lithium complex oxide, the lithium complex oxide including lithium (Li) and at least one kind selected from the group consisting of cobalt (Co), nickel (Ni) and manganese (Mn), and
forming a surface layer on a central section of the cathode active material, the surface layer including lithium (Li), PO$_4$, aluminum (Al) and at least one kind selected from the group consisting of nickel (Ni), cobalt (Co), manganese (Mn), iron (Fe), magnesium (Mg) and zinc (Zn), wherein
as the lithium complex oxide, at least one kind selected from the group consisting of compounds represented by Chemical Formulas 1, 2 and 3 is included:

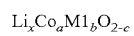 (Chemical Formula 1)

$Li_xCo_aM1_bO_{2-c}$ (where M1 represents at least one kind selected from the group consisting of nickel (Ni), manganese (Mn), magnesium (Mg), aluminum (Al), boron (B), titanium (Ti), vanadium (V), chromium (Cr), iron, copper (Cu), zinc (Zn), molybdenum (Mo), tin (Sn), calcium (Ca), strontium (Sr), tungsten (W), zirconium (Zr) and silicon (Si), the values of x, a, b and c are within ranges of $0.8 \leq x \leq 1.2$, $0.8 \leq a \leq 1$, $0 \leq b \leq 0.2$ and $-0.1 \leq c \leq 0.2$, respectively);

 (Chemical Formula 2)

$Li_yNi_dM2_eO_{2-f}$ where M2 represents at least one kind selected from the group consisting of cobalt, manganese, magnesium, aluminum, boron, titanium, vanadium, chromium, iron, copper, zinc, molybdenum, tin, calcium, strontium, tungsten, zirconium and silicon, the values of y, d, e and f are within ranges of $0.8 \leq y \leq 1.2$, $0.3 \leq d \leq 0.98$, $0.02 \leq e \leq 0.7$ and $-0.1 \leq f \leq 0.2$, respectively);

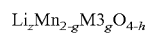 (Chemical Formula 3)

$Li_zMn_{2-g}M3_gO_{4-h}$ (where M3 represents at least one kind selected from the group consisting of cobalt, nickel, magnesium, aluminum, boron, titanium, vanadium, chromium, iron, copper, zinc, molybdenum, tin, calcium, strontium and tungsten, the values of z, g and h are within ranges of $0.8 \leq z \leq 1.2$, $0 \leq g < 1.0$ and $-0.2 \leq h \leq 0.2$, respectively).

6. The battery according to claim 5, wherein magnesium is included in the surface layer.

7. The battery according to claim 5, wherein the surface layer includes magnesium, and for the surface layer, the elemental phosphorus in $PO_4$ and elemental magnesium is within a range from 0.1 mol % to 4.0 mol % both inclusive relative to the lithium complex oxide.

8. The battery according to claim 5, wherein the open circuit voltage in a fully charged state per a pair of the cathode and the anode is within a range from 4.25 V to 4.6 V both inclusive.

9. The battery according to claim 5, wherein for the surface layer, an atomic ratio of the elemental phosphorus in $PO_4$ to aluminum (Al) ranges from 0.35 to 12.7 both inclusive.

10. A method of manufacturing a cathode active material comprising the step of:

providing lithium complex oxide particle including lithium (Li) and at least one kind selected from the group consisting of cobalt (Co), nickel (Ni) and manganese (Mn); and forming a surface layer on a central section of the lithium complex oxide, the surface layer including lithium (Li), $PO_4$, aluminum (Al) and at least one kind selected from the group consisting of nickel (Ni), cobalt (Co), manganese (Mn), iron (Fe), magnesium (Mg) and zinc (Zn); and firing the lithium complex oxide particles, wherein for the surface layer, an atomic ratio of phosphorus (P) to aluminum (Al) ranges from 0.35 to 12.7 both inclusive, and wherein as the lithium complex oxide, at least one kind selected from the group consisting of compounds represented by Chemical Formulas 1, 2 and 3 is included:

$Li_xCo_aM1_bO_{2-c}$  (Chemical Formula 1)

(where M1 represents at least one kind selected from the group consisting of nickel (Ni), manganese (Mn), magnesium (Mg), aluminum (Al), boron (B), titanium (Ti), vanadium (V), chromium (Cr), iron, copper (Cu), zinc (Zn), molybdenum (Mo), tin (Sn), calcium (Ca), strontium (Sr), tungsten (W), zirconium (Zr) and silicon (Si), the values of x, a, b and c are within ranges of $0.8 \leq x \leq 1.2$, $0.8 \leq a \leq 1$, $0 \leq b \leq 0.2$ and $-0.1 \leq c \leq 0.2$, respectively);

$Li_yNi_dM2_eO_{2-f}$ 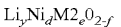 (Chemical Formula 2)

(where M2 represents at least one kind selected from the group consisting of cobalt, manganese, magnesium, aluminum, boron, titanium, vanadium, chromium, iron, copper, zinc, molybdenum, tin, calcium, strontium, tungsten, zirconium and silicon, the values of y, d, e and f are within ranges of $0.8 \leq y \leq 1.2$, $0.3 \leq d \leq 0.98$, $0.02 \leq e \leq 0.7$ and $-0.1 \leq f \leq 0.2$, respectively);

$Li_zMn_{2-g}M3_gO_{4-h}$ 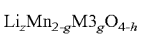 (Chemical Formula 3)

(where M3 represents at least one kind selected from the group consisting of cobalt, nickel, magnesium, aluminum, boron, titanium, vanadium, chromium, iron, copper, zinc, molybdenum, tin, calcium, strontium and tungsten, the values of z, g and h are within ranges of $0.8 \leq z \leq 1.2$, $0 \leq g < 1.0$ and $-0.2 \leq h \leq 0.2$, respectively).

11. The method of manufacturing a cathode active material according to claim 10, wherein for the surface layer, an atomic ratio of the elemental phosphorus in $PO_4$ to aluminum (Al) ranges from 0.35 to 12.7 both inclusive.

* * * * *